US010288844B2

(12) United States Patent
Lai et al.

(10) Patent No.: US 10,288,844 B2
(45) Date of Patent: *May 14, 2019

(54) OPTICAL IMAGE CAPTURING SYSTEM

(71) Applicant: ABILITY OPTO-ELECTRONICS TECHNOLOGY CO., LTD., Taichung (TW)

(72) Inventors: Chien-Hsun Lai, Taichung (TW); Nai-Yuan Tang, Taichung (TW); Yeong-Ming Chang, Taichung (TW)

(73) Assignee: ABILITY OPTO-ELECTRONICS TECHNOLOGY CO., LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/379,788

(22) Filed: Dec. 15, 2016

(65) Prior Publication Data

US 2018/0011296 A1 Jan. 11, 2018

(30) Foreign Application Priority Data

Jul. 6, 2016 (TW) .............................. 105121401 A

(51) Int. Cl.
| | | |
|---|---|---|
| G02B 9/64 | (2006.01) | |
| G02B 13/00 | (2006.01) | |
| G02B 5/00 | (2006.01) | |
| G02B 5/20 | (2006.01) | |
| G02B 27/00 | (2006.01) | |

(52) U.S. Cl.
CPC ......... *G02B 13/0045* (2013.01); *G02B 5/005* (2013.01); *G02B 5/208* (2013.01); *G02B 9/64* (2013.01); *G02B 27/0025* (2013.01)

(58) Field of Classification Search
CPC ...... G02B 3/02; G02B 13/04; G02B 13/0045; G02B 9/64
USPC ......................................... 359/708, 751, 755
See application file for complete search history.

(56) References Cited

U.S. PATENT DOCUMENTS

| | | | | |
|---|---|---|---|---|
| 9,746,644 B2* | 8/2017 | Tang | ................... | G02B 13/0045 |
| 9,851,536 B2* | 12/2017 | Tang | ........................ | G02B 7/04 |
| 9,989,739 B2* | 6/2018 | Lai | .......................... | G02B 13/06 |
| 2016/0131874 A1 | 5/2016 | Tang et al. | | |
| 2017/0248772 A1* | 8/2017 | Tang | ................... | G02B 13/0045 |
| 2017/0248773 A1* | 8/2017 | Tang | ................... | G02B 13/0045 |

(Continued)

FOREIGN PATENT DOCUMENTS

| | | |
|---|---|---|
| CN | 103869452 A | 6/2014 |
| TW | M503575 U | 6/2015 |
| TW | 201617675 A | 5/2016 |

*Primary Examiner* — William Choi
(74) *Attorney, Agent, or Firm* — Muncy, Geissler, Olds & Lowe, P.C.

(57) ABSTRACT

An optical image capturing system includes, along the optical axis in order from an object side to an image side, a first lens, a second lens, a third lens, a fourth lens, a fifth lens, a sixth lens, and a seventh lens. At least one lens among the first to the sixth lenses has positive refractive force. The seventh lens can have negative refractive force, wherein both surfaces thereof are aspheric, and at least one surface thereof has an inflection point. The lenses in the optical image capturing system which have refractive power include the first to the seventh lenses. The optical image capturing system can increase aperture value and improve the imaging quality for use in compact cameras.

24 Claims, 18 Drawing Sheets

(56) References Cited

U.S. PATENT DOCUMENTS

| | | | |
|---|---|---|---|
| 2017/0254981 A1* | 9/2017 | Lai | G02B 7/04 |
| 2017/0254983 A1* | 9/2017 | Lai | G02B 5/005 |
| 2017/0254985 A1* | 9/2017 | Lai | G02B 13/06 |
| 2017/0254987 A1* | 9/2017 | Lai | G02B 5/005 |
| 2017/0285305 A1* | 10/2017 | Lai | G02B 13/0045 |
| 2017/0329107 A1* | 11/2017 | Lai | G02B 13/0045 |
| 2017/0336605 A1* | 11/2017 | Lai | G02B 5/005 |
| 2018/0335608 A1* | 11/2018 | Chang | G02B 13/0045 |

* cited by examiner

OPTICAL IMAGE CAPTURING SYSTEM

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has five or six lenses. However, the optical system is asked to take pictures in a dark environment, in other words, the optical system is asked to have a large aperture. The conventional optical system provides high optical performance as required.

It is an important issue to increase the quantity of light entering the lens. In addition, the modern lens is also asked to have several characters, including high image quality.

BRIEF SUMMARY OF THE INVENTION

The aspect of embodiment of the present disclosure directs to an optical image capturing system and an optical image capturing lens which use combination of refractive powers, convex and concave surfaces of seven-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens:

A maximum height for image formation of the optical image capturing system is denoted by HOI. A height of the optical image capturing system is denoted by HOS. A distance from the object-side surface of the first lens to the image-side surface of the seventh lens is denoted by InTL. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to an arc length of the shape of a surface and a surface profile:

For any surface of any lens, a profile curve length of the maximum effective half diameter is, by definition, measured from a start point where the optical axis of the belonging optical image capturing system passes through the surface of the lens, along a surface profile of the lens, and finally to an end point of the maximum effective half diameter thereof. In other words, the curve length between the aforementioned start and end points is the profile curve length of the maximum effective half diameter, which is denoted by ARS. For example, the profile curve length of the maximum effective half diameter of the object-side surface of the first lens is denoted by ARS11, the profile curve length of the maximum effective half diameter of the image-side surface of the first lens is denoted by ARS12, the profile curve length of the maximum effective half diameter of the object-side surface of the second lens is denoted by ARS21, the profile curve length of the maximum effective half diameter of the image-side surface of the second lens is denoted by ARS22, and so on.

For any surface of any lens, a profile curve length of a half of the entrance pupil diameter (HEP) is, by definition, measured from a start point where the optical axis of the belonging optical image capturing system passes through the surface of the lens, along a surface profile of the lens, and finally to a coordinate point of a perpendicular distance where is a half of the entrance pupil diameter away from the optical axis. In other words, the curve length between the aforementioned stat point and the coordinate point is the profile curve length of a half of the entrance pupil diameter (HEP), and is denoted by ARE. For example, the profile curve length of a half of the entrance pupil diameter (HEP) of the object-side surface of the first lens is denoted by ARE11, the profile curve length of a half of the entrance pupil diameter (HEP) of the image-side surface of the first lens is denoted by ARE12, the profile curve length of a half of the entrance pupil diameter (HEP) of the object-side surface of the second lens is denoted by ARE21, the profile curve length of a half of the entrance pupil diameter (HEP) of the image-side surface of the second lens is denoted by ARE22, and so on.

The lens parameter related to a depth of the lens shape:

A distance in parallel with the optical axis from a point where the optical axis passes through to an end point of the maximum effective semi diameter on the object-side surface of the seventh lens is denoted by InRS71 (the depth of the maximum effective semi diameter). A distance in parallel with the optical axis from a point where the optical axis passes through to an end point of the maximum effective semi diameter on the image-side surface of the seventh lens is denoted by InRS72 (the depth of the maximum effective semi diameter). The depth of the maximum effective semi diameter (sinkage) on the object-side surface or the image-side surface of any other lens is denoted in the same manner.

The lens parameter related to the lens shape:

A critical point C is a tangent point on a surface of a specific lens, and the tangent point is tangent to a plane perpendicular to the optical axis and the tangent point cannot be a crossover point on the optical axis. Following the above description, a distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point C61 on the object-side surface of the sixth lens and the optical axis is HVT61 (instance), and a distance perpendicular to the optical axis between a critical point C62 on the image-side surface of the sixth lens and the optical axis is HVT62 (instance). A distance perpendicular to the optical axis between a critical point on the object-side or image-side surface of other lenses, such as the seventh lens, and the optical axis is denoted in the same manner.

The object-side surface of the seventh lens has one inflection point IF711 which is nearest to the optical axis, and the sinkage value of the inflection point IF711 is denoted by SGI711 (instance). A distance perpendicular to the optical axis between the inflection point IF711 and the optical axis is HIF711 (instance). The image-side surface of the seventh lens has one inflection point IF721 which is nearest to the optical axis, and the sinkage value of the inflection point IF721 is denoted by SGI721 (instance). A distance perpendicular to the optical axis between the inflection point IF721 and the optical axis is HIF721 (instance).

The object-side surface of the seventh lens has one inflection point IF712 which is the second nearest to the optical axis, and the sinkage value of the inflection point IF712 is denoted by SGI712 (instance). A distance perpendicular to the optical axis between the inflection point IF712 and the optical axis is HIF712 (instance). The image-side surface of the seventh lens has one inflection point IF722 which is the second nearest to the optical axis, and the sinkage value of the inflection point IF722 is denoted by SGI722 (instance). A distance perpendicular to the optical axis between the inflection point IF722 and the optical axis is HIF722 (instance).

The object-side surface of the seventh lens has one inflection point IF713 which is the third nearest to the optical axis, and the sinkage value of the inflection point IF713 is denoted by SGI713 (instance). A distance perpendicular to the optical axis between the inflection point IF713 and the optical axis is HIF713 (instance). The image-side surface of the seventh lens has one inflection point IF723 which is the third nearest to the optical axis, and the sinkage value of the inflection point IF723 is denoted by SGI723 (instance). A distance perpendicular to the optical axis between the inflection point IF723 and the optical axis is HIF723 (instance).

The object-side surface of the seventh lens has one inflection point IF714 which is the fourth nearest to the optical axis, and the sinkage value of the inflection point IF714 is denoted by SGI714 (instance). A distance perpendicular to the optical axis between the inflection point IF714 and the optical axis is HIF714 (instance). The image-side surface of the seventh lens has one inflection point IF724 which is the fourth nearest to the optical axis, and the sinkage value of the inflection point IF724 is denoted by SGI724 (instance). A distance perpendicular to the optical axis between the inflection point IF724 and the optical axis is HIF724 (instance).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%400% field. An offset of the spherical aberration is denoted by DFS. An offset of the coma aberration is denoted by DFC.

Transverse aberration on an edge of an aperture is denoted by STA, which stands for STOP transverse aberration, and is used to evaluate the performance of one specific optical image capturing system. The transverse aberration of light in any field of view can be calculated with a tangential fan or a sagittal fan. More specifically, the transverse aberration caused when the longest operation wavelength (e.g., 650 nm) and the shortest operation wavelength (e.g., 470 nm) pass through the edge of the aperture can be used as the reference for evaluating performance. The coordinate directions of the aforementioned tangential fan can be further divided into a positive direction (upper light) and a negative direction (lower light). The longest operation wavelength which passes through the edge of the aperture has an imaging position on the image plane in a particular field of view, and the reference wavelength of the mail light (e.g., 555 nm) has another imaging position on the image plane in the same field of view. The transverse aberration caused when the longest operation wavelength passes through the edge of the aperture is defined as a distance between these two imaging positions. Similarly, the shortest operation wavelength which passes through the edge of the aperture has an imaging position on the image plane in a particular field of view, and the transverse aberration caused when the shortest operation wavelength passes through the edge of the aperture is defined as a distance between the imaging position of the shortest operation wavelength and the imaging position of the reference wavelength. The performance of the optical image capturing system can be considered excellent if the transverse aberrations of the shortest and the longest operation wavelength which pass through the edge of the aperture and image on the image plane in 0.7 field of view (i.e., 0.7 times the height for image formation HOI) are both less than 100 μm. Furthermore, for a stricter evaluation, the performance cannot be considered excellent unless the transverse aberrations of the shortest and the longest operation wavelength which pass through the edge of the aperture and image on the image plane in 0.7 field of view are both less than 80 μm.

The optical image capturing system has a maximum image height HOI on the image plane vertical to the optical axis. A transverse aberration at 0.7 HOI in the positive direction of the tangential fan after the longest operation wavelength of visible light passing through the edge of the aperture is denoted by PLTA; a transverse aberration at 0.7 HOI in the positive direction of the tangential fan after the shortest operation wavelength of visible light passing through the edge of the aperture is denoted by PSTA; a transverse aberration at 0.7 HOI in the negative direction of the tangential fan after the longest operation wavelength of visible light passing through the edge of the aperture is denoted by NLTA; a transverse aberration at 0.7 HOI in the negative direction of the tangential fan after the shortest operation wavelength of visible light passing through the edge of the aperture is denoted by NSTA; a transverse aberration at 0.7 HOI of the sagittal fan after the longest operation wavelength of visible light passing through the edge of the aperture is denoted by SLTA; a transverse aberration at 0.7 HOI of the sagittal fan after the shortest operation wavelength of visible light passing through the edge of the aperture is denoted by SSTA.

The present invention provides an optical image capturing system capable of focusing for both visible light and infrared light (i.e., dual mode) with certain performance, in which the seventh lens is provided with an inflection point at the object-side surface or at the image-side surface to adjust the incident angle of each view field and modify the ODT and the TDT. In addition, the surfaces of the seventh lens are capable of modifying the optical path to improve the imagining quality.

The optical image capturing system of the present invention includes a first lens, a second lens, a third lens, a fourth lens, a fifth lens, a sixth lens, a seventh lens, and an image plane in order along an optical axis from an object side to an image side. The first lens has refractive power. The optical image capturing system satisfies:

$1.0 \le f/HEP \le 10.0$; $0 \text{ deg} < HAF \le 150 \text{ deg}$; and $0.9 \le 2(ARE/HEP) \le 2.0$;

where f1, f2, f3, f4, f5, f6, and f7 are respectively the focal lengths of the first lens to the seventh lens; f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the seventh lens on the optical axis; HAF is a half of the maximum field angle; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, a fourth lens, a fifth lens, a sixth lens, a seventh lens, and an image plane in order along an optical axis from an object side to an image side. The first lens has refractive power. The second lens has refractive power. The third lens has refractive power. The fourth lens has refractive power. The fifth lens has refractive power. The sixth lens has refractive power. The seventh lens has refractive power, wherein the object-side surface and the image-side surface thereof are both aspheric surfaces. At least one surface of each of at least one lens among the first lens to the seventh lens has at least an inflection point thereon. The optical image capturing system satisfies:

$1.0 \le f/HEP \le 10.0$; $0 \text{ deg} < HAF \le 150 \text{ deg}$; and $0.9 \le 2(ARE/HEP) \le 2.0$;

where f1, f2, f3, f4, f5, f6, and f7 are respectively the focal lengths of the first lens to the seventh lens; f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the seventh lens on the optical axis; HAF is a half of the maximum field angle; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, a fourth lens, a fifth lens, a sixth lens, a seventh lens, and an image plane, in order along an optical axis from an object side to an image side. The number of the lenses having refractive power in the optical image capturing system is seven. At least one surface of each of at least one lens among the first lens to the seventh lens has at least an inflection point thereon. The first lens has negative refractive power, and the second lens has refractive power. The third lens has refractive power. The fourth lens has refractive power. The fifth lens has refractive power. The sixth lens has refractive power. The seventh lens has refractive power. The optical image capturing system satisfies:

$1.0 \le f/HEP \le 10.0$; $0 \text{ deg} < HAF \le 150 \text{ deg}$; and $0.9 \le 2(ARE/HEP) \le 2.0$;

where f1, f2, f3, f4, f5, f6, and f7 are respectively the focal lengths of the first lens to the seventh lens; f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the seventh lens on the optical axis; HAF is a half of the maximum field angle; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

For any surface of any lens, the profile curve length within the effective half diameter affects the ability of the surface to correct aberration and differences between optical paths of light in different fields of view. With longer profile curve length, the ability to correct aberration is better. However, the difficulty of manufacturing increases as well. Therefore, the profile curve length within the effective half diameter of any surface of any lens has to be controlled. The ratio between the profile curve length (ARS) within the effective half diameter of one surface and the thickness (TP) of the lens, which the surface belonged to, on the optical axis (i.e., ARS/TP) has to be particularly controlled. For example, the profile curve length of the maximum effective half diameter of the object-side surface of the first lens is denoted by ARS11, the thickness of the first lens on the optical axis is TP1, and the ratio between these two parameters is ARS11/TP1; the profile curve length of the maximum effective half diameter of the image-side surface of the first lens is denoted by ARS12, and the ratio between ARS12 and TP1 is ARS12/TP1. The profile curve length of the maximum effective half diameter of the object-side surface of the second lens is denoted by ARS21, the thickness of the second lens on the optical axis is TP2, and the ratio between these two parameters is ARS21/TP2; the profile curve length of the maximum effective half diameter of the image-side surface of the second lens is denoted by ARS22, and the ratio between ARS22 and TP2 is ARS22/TP2. For any surface of other lenses in the optical image capturing system, the ratio between the profile curve length of the maximum effective half diameter thereof and the thickness of the lens which the surface belonged to is denoted in the same manner.

For any surface of any lens, the profile curve length within a half of the entrance pupil diameter (HEP) affects the ability of the surface to correct aberration and differences between optical paths of light in different fields of view. With longer profile curve length, the ability to correct aberration is better. However, the difficulty of manufacturing increases as well. Therefore, the profile curve length within a half of the entrance pupil diameter (HEP) of any surface of any lens has to be controlled. The ratio between the profile curve length (ARE) within a half of the entrance pupil diameter (HEP) of one surface and the thickness (TP) of the lens, which the surface belonged to, on the optical axis (i.e., ARE/TP) has to be particularly controlled. For example, the profile curve length of a half of the entrance pupil diameter (HEP) of the object-side surface of the first lens is denoted by ARE11, the thickness of the first lens on the optical axis is TP1, and the ratio between these two parameters is ARE11/TP1; the profile curve length of a half of the entrance pupil diameter (HEP) of the image-side surface of the first lens is denoted by ARE12, and the ratio between ARE12 and TP1 is ARE12/TP1. The profile curve length of a half of the entrance pupil diameter (HEP) of the object-side surface of the second lens is denoted by ARE21, the thickness of the second lens on the optical axis is TP2, and the ratio between these two parameters is ARE21/TP2; the profile curve length of a half of the entrance pupil diameter (HEP) of the image-side surface of the second lens is denoted by ARE22, and the ratio between ARE22 and TP2 is ARE22/TP2. For any surface of other lenses in the optical image capturing system, the ratio between the profile curve length of a half of the entrance pupil diameter (HEP) thereof and the thickness of the lens which the surface belonged to is denoted in the same manner.

In an embodiment, a height of the optical image capturing system (HOS) can be reduced if |f1|>|f7|.

In an embodiment, when |f2|+|f3|+|f4|+|f5|+|f6| and |f1|+|f7| of the lenses satisfy the aforementioned conditions, at least one lens among the second to the sixth lenses could have weak positive refractive power or weak negative refractive power. Herein the weak refractive power means the absolute value of the focal length of one specific lens is greater than 10. When at least one lens among the second to the sixth lenses has weak positive refractive power, it may share the positive refractive power of the first lens, and on the contrary, when at least one lens among the second to the sixth lenses has weak negative refractive power, it may fine turn and correct the aberration of the system.

In an embodiment, the seventh lens could have negative refractive power, and an image-side surface thereof is concave, it may reduce back focal length and size. Besides, the seventh lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
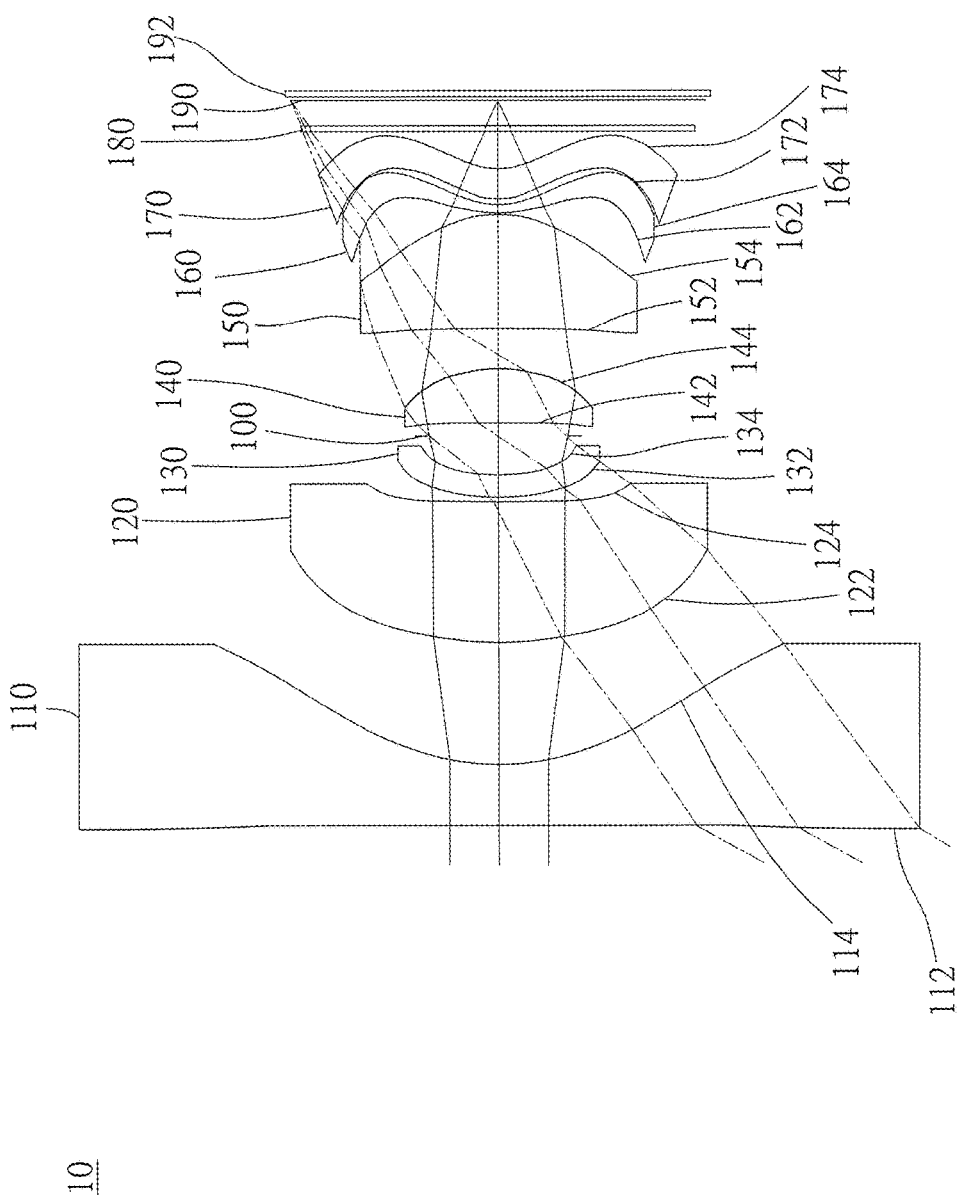
FIG. 1A is a schematic diagram of a first embodiment of the present invention.
Figure 1:
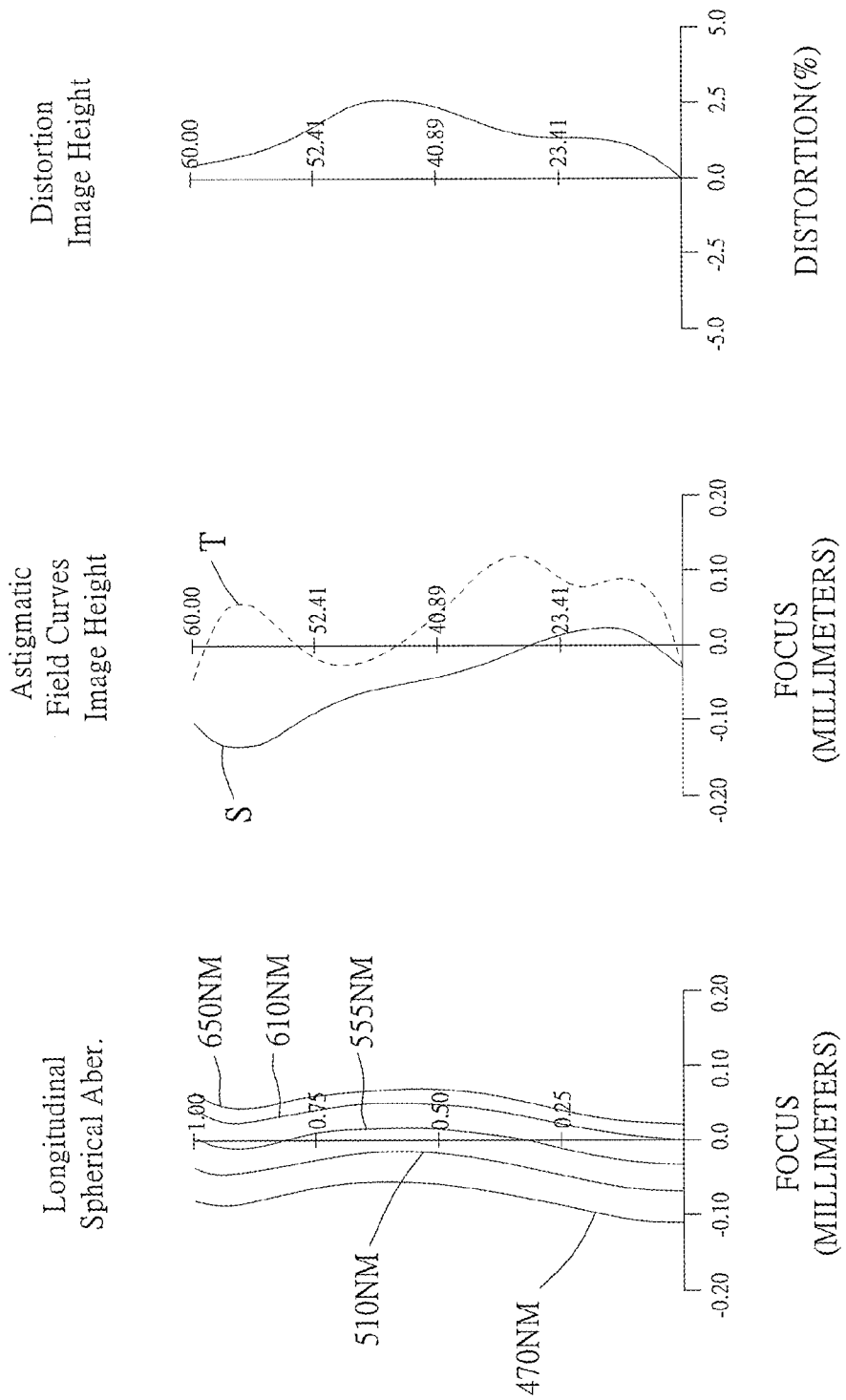
FIG. 1B shows curve diagrams of longitudinal spherical aberration, astigmatic field, and optical distortion of the optical image capturing system in the order from left to right of the first embodiment of the present application.
FIG. 1C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.

An optical image capturing system of the present invention includes a first lens, a second lens, a third lens, a fourth lens, a fifth lens, a sixth lens, a seventh lens, and an image plane from an object side to an image side. The optical image capturing system further is provided with an image sensor at an image plane, wherein the image heights of the following embodiments are all around 3.91 mm.

The optical image capturing system can work in three wavelengths, including 486.1 nm, 587.5 nm, and 656.2 nm, wherein 587.5 nm is the main reference wavelength and is the reference wavelength for obtaining the technical characters. The optical image capturing system can also work in five wavelengths, including 470 nm, 510 nm, 555 nm, 610 nm, and 650 nm wherein 555 nm is the main reference wavelength, and is the reference wavelength for obtaining the technical characters.

The optical image capturing system of the present invention satisfies $0.5 \leq \Sigma PPR/|\Sigma NPR| \leq 15$, and a preferable range is $1 \leq \Sigma PPR/|\Sigma NPR| \leq 3.0$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; $\Sigma PPR$ is a sum of the PPRs of each positive lens; and $\Sigma NPR$ is a sum of the NPRs of each negative lens. It is helpful for control of an entire refractive power and an entire length of the optical image capturing system.

The image sensor is provided on the image plane. The optical image capturing system of the present invention satisfies $HOS/HOI \leq 10$; and $0.5 \leq HOS/f \leq 10$, and a preferable range is $1 \leq HOS/HOI \leq 5$; and $1 \leq HOS/f \leq 7$, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies $0.2 \leq InS/HOS \leq 1.1$, where InS is a distance between the aperture and the image-side surface of the sixth lens. It is helpful for size reduction and wide angle.

The optical image capturing system of the present invention satisfies $0.1 \leq \Sigma TP/InTL \leq 0.9$, where InTL is a distance between the object-side surface of the first lens and the image-side surface of the seventh lens, and $\Sigma TP$ is a sum of central thicknesses of the lenses on the optical axis. It is helpful for the contrast of image and yield rate of manufacture and provides a suitable back focal length for installation of other elements.

The optical image capturing system of the present invention satisfies $0.001 \leq |R1/R2| \leq 20$, and a preferable range is $0.01 \leq |R1/R2| < 10$, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies $-7 < (R13-R14)/(R13+R14) < 50$, where R13 is a radius of curvature of the object-side surface of the seventh lens, and R14 is a radius of curvature of the image-side surface of the seventh lens. It may modify the astigmatic field curvature.

The optical image capturing system of the present invention satisfies $IN12/f \leq 3.0$, where IN12 is a distance on the optical axis between the first lens and the second lens. It may correct chromatic aberration and improve the performance.

The optical image capturing system of the present invention satisfies $IN67/f \leq 0.8$, where IN67 is a distance on the optical axis between the sixth lens and the seventh lens. It may correct chromatic aberration and improve the performance.

The optical image capturing system of the present invention satisfies $0.1 \leq (TP1+IN12)/TP2 \leq 10$, where TP1 is a central thickness of the first lens on the optical axis, and TP2 is a central thickness of the second lens on the optical axis. It may control the sensitivity of manufacture of the system and improve the performance.

The optical image capturing system of the present invention satisfies $0.1 \leq (TP7+IN67)/TP6 \leq 10$, where TP6 is a central thickness of the sixth lens on the optical axis, TP7 is a central thickness of the seventh lens on the optical axis, and IN67 is a distance between the sixth lens and the seventh lens. It may control the sensitivity of manufacture of the system and improve the performance.

The optical image capturing system of the present invention satisfies $0.1 \leq TP4/(IN34+TP4+IN45) < 1$, where TP3 is a central thickness of the third lens on the optical axis, TP4 is a central thickness of the fourth lens on the optical axis, TP5 is a central thickness of the fifth lens on the optical axis, IN34 is a distance on the optical axis between the third lens and the fourth lens, IN45 is a distance on the optical axis between the fourth lens and the fifth lens, and InTL is a distance between the object-side surface of the first lens and the image-side surface of the seventh lens. It may fine tune and correct the aberration of the incident rays layer by layer, and reduce the height of the system.

The optical image capturing system satisfies 0 mm$\leq$HVT71$\leq$3 mm; 0 mm<HVT72$\leq$6 mm; 0$\leq$HVT71/HVT 72; 0 mm$\leq$|SGC71|$\leq$0.5 mm; 0 mm<|SGC72|$\leq$2 mm; and 0<|SGC72|/(|SGC72|+TP7)$\leq$0.9, where HVT71 a distance perpendicular to the optical axis between the critical point C71 on the object-side surface of the seventh lens and the optical axis; HVT72 a distance perpendicular to the optical axis between the critical point C72 on the image-side surface of the seventh lens and the optical axis; SGC71 is a distance in parallel with the optical axis between an point on the object-side surface of the seventh lens where the optical axis passes through and the critical point C71; SGC72 is a distance in parallel with the optical axis between an point on the image-side surface of the seventh lens where the optical axis passes through and the critical point C72. It is helpful to correct the off-axis view field aberration.

The optical image capturing system satisfies 0.2≤HVT72/HOI≤0.9, and preferably satisfies 0.3≤HVT72/HOI≤0.8. It may help to correct the peripheral aberration.

The optical image capturing system satisfies 0≤HVT72/HOS≤0.5, and preferably satisfies 0.2≤HVT72/HOS≤0.45. It may help to correct the peripheral aberration.

The optical image capturing system of the present invention satisfies 0<SGI711/(SGI711+TP7)≤0.9; 0<SGI721/(SGI721+TP7)≤0.9, and it is preferable to satisfy 0.1≤SGI711/(SGI711+TP7)≤0.6; 0.1≤SGI721/(SGI721+TP7)≤0.6, where SGI711 is a displacement in parallel with the optical axis, from a point on the object-side surface of the seventh lens, through which the optical axis passes, to the inflection point on the object-side surface, which is the closest to the optical axis, and SGI721 is a displacement in parallel with the optical axis, from a point on the image-side surface of the seventh lens, through which the optical axis passes, to the inflection point on the image-side surface, which is the closest to the optical axis.

The optical image capturing system of the present invention satisfies 0<SGI712/(SGI712+TP7)≤0.9; 0<SGI722/(SGI722+TP7)≤0.9, and it is preferable to satisfy 0.1≤SGI712/(SGI712+TP7)≤0.6; 0.1≤SGI722/(SGI722+TP7)≤0.6, where SGI712l is a displacement in parallel with the optical axis, from a point on the object-side surface of the seventh lens, through which the optical axis passes, to the inflection point on the object-side surface, which is the second closest to the optical axis, and SGI722 is a displacement in parallel with the optical axis, from a point on the image-side surface of the seventh lens, through which the optical axis passes, to the inflection point on the image-side surface, which is the second closest to the optical axis.

The optical image capturing system of the present invention satisfies 0.001 mm≤|HIF711|≤5 mm; 0.001 mm≤|HIF721|≤5 mm, and it is preferable to satisfy 0.1 mm≤|HIF711|≤3.5 mm; 1.5 min≤|HIF721|≤3.5 mm, where HIF711 is a distance perpendicular to the optical axis between the inflection point on the object-side surface of the seventh lens, which is the closest to the optical axis, and the optical axis; HIF721 is a distance perpendicular to the optical axis between the inflection point on the image-side surface of the seventh lens, which is the closest to the optical axis, and the optical axis.

The optical image capturing system of the present invention satisfies 0.001 mm≤|HIF712|≤5 mm; 0.001 mm≤|HIF722|≤5 mm, and it is preferable to satisfy 0.1 mm≤|HIF722|≤3.5 mm; 0.1 mm≤|HIF712|≤3.5 mm, where HIF712 is a distance perpendicular to the optical axis between the inflection point on the object-side surface of the seventh lens, which is the second closest to the optical axis, and the optical axis; HIF722 is a distance perpendicular to the optical axis between the inflection point on the image-side surface of the seventh lens, which is the second closest to the optical axis, and the optical axis.

The optical image capturing system of the present invention satisfies 0.001 mm≤|HIF713|≤5 mm; 0.001 mm≤|HIF723|≤5 mm, and it is preferable to satisfy 0.1 mm≤|HIF723|≤3.5 mm; 0.1 mm≤|HIF713|≤3.5 mm, where HIF713 is a distance perpendicular to the optical axis between the inflection point on the object-side surface of the seventh lens, which is the third closest to the optical axis, and the optical axis; HIF723 is a distance perpendicular to the optical axis between the inflection point on the image-side surface of the seventh lens, which is the third closest to the optical axis, and the optical axis.

The optical image capturing system of the present invention satisfies 0.001 mm≤|HIF714|≤5 mm; 0.001 mm≤|HIF724|≤5 mm, and it is preferable to satisfy 0.1 mm≤|HIF724|≤3.5 mm; 0.1 mm≤|HIF714|≤3.5 mm, where HIF714 is a distance perpendicular to the optical axis between the inflection point on the object-side surface of the seventh lens, which is the fourth closest to the optical axis, and the optical axis; HIF724 is a distance perpendicular to the optical axis between the inflection point on the image-side surface of the seventh lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z = ch^2/[1+[1(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the seventh lenses could be aspheric that can obtain more control parameters to reduce aberration. The number of aspheric glass lenses could be less than the conventional spherical glass lenses, which is helpful for reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the seventh lens of the optical image capturing system of the present invention can be a light filter, which filters out light of wavelength shorter than 500 nm. Such effect can be achieved by coating on at least one surface of the lens, or by using materials capable of filtering out short waves to make the lens.

To meet different requirements, the image plane of the optical image capturing system in the present invention can be either flat or curved. If the image plane is curved (e.g., a sphere with a radius of curvature), the incidence angle required for focusing light on the image plane can be decreased, which is not only helpful to shorten the length of the system (TTL), but also helpful to increase the relative illuminance.

We provide several embodiments in conjunction with the accompanying drawings for the best understanding, which are:

[First Embodiment]

Figure 1C:
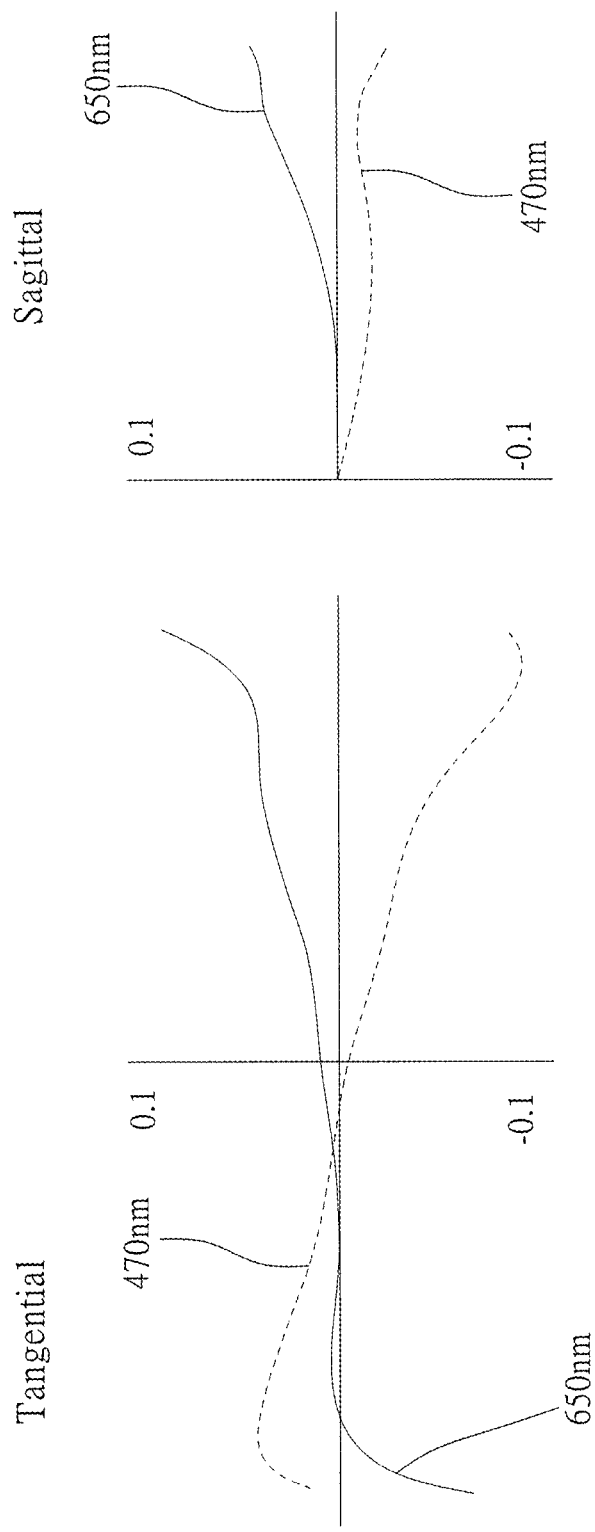

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, a fourth lens 140, a fifth lens 150, a sixth lens 160, a seventh lens 170, an infrared rays filter 180, an image plane 190, and an image sensor 192. FIG. 1C shows a tangential fan and a sagittal fan of the optical image capturing system 10 of the first embodiment of the present application, and a transverse aberration diagram at 0.7 field of view when a longest operation wavelength and a shortest operation wavelength pass through an edge of the aperture 100.

The first lens 110 has negative refractive power and is made of plastic. An object-side surface 112 thereof, which faces the object side, is a concave aspheric surface, and an image-side surface 114 thereof, which faces the image side, is a concave aspheric surface. The object-side surface 112 has an inflection point, and the image-side surface 114 has two inflection points. A profile curve length of the maximum effective half diameter of an object-side surface of the first lens 110 is denoted by ARS11, and a profile curve length of the maximum effective half diameter of the image-side surface of the first lens 110 is denoted by ARS12. A profile curve length of a half of an entrance pupil diameter (HEP) of the object-side surface of the first lens 110 is denoted by ARE11, and a profile curve length of a half of the entrance pupil diameter (HEP) of the image-side surface of the first lens 110 is denoted by ARE12. A thickness of the first lens 110 on the optical axis is TP1.

The first lens 110 satisfies SGI111=−0.1110 mm; SGI121=2.7120 mm; TP1=2.2761 mm; |SGI111|/(|SGI111|+TP1)=0.0465; |SGI121|/(|SGI121|+TP1)=0.5437, where a displacement in parallel with the optical axis from a point on the object-side surface of the first lens, through which the optical axis passes, to the inflection point on the image-side surface, which is the closest to the optical axis is denoted by SGI111, and a displacement in parallel with the optical axis from a point on the image-side surface of the first lens, through which the optical axis passes, to the inflection point on the image-side surface, which is the closest to the optical axis is denoted by SGI121.

The first lens 110 satisfies SGI112=0 mm; SGI122=4.2315 mm; |SGI112|/(|SGI112|+TP1)=0; |SGI122|/(|SGI122|+TP1)=0.6502, where a displacement in parallel with the optical axis from a point on the object-side surface of the first lens, through which the optical axis passes, to the inflection point on the image-side surface, which is the second closest to the optical axis is denoted by SGI112, and a displacement in parallel with the optical axis from a point on the image-side surface of the first lens, through which the optical axis passes, to the inflection point on the image-side surface, which is the second closest to the optical axis is denoted by SGI122.

The first lens 110 satisfies HIF111=12.8432 mm; HIF111/HOI=1.7127; HIF121=7.1744 mm; HIF121/HOI=0.9567, where a displacement perpendicular to the optical axis from a point on the object-side surface of the first lens, through which the optical axis passes, to the inflection point, which is the closest to the optical axis is denoted by HIF111, and a displacement perpendicular to the optical axis from a point on the image-side surface of the first lens, through which the optical axis passes, to the inflection point, which is the closest to the optical axis is denoted by HIF121.

The first lens 110 satisfies HIF112=0 mm; HIF112/HOI=0; HIF122=9.8592 mm; HIF122/HOI=1.3147, where a displacement perpendicular to the optical axis from a point on the object-side surface of the first lens, through which the optical axis passes, to the inflection point, which is the second closest to the optical axis is denoted by HIF112, and a displacement perpendicular to the optical axis from a point on the image-side surface of the first lens, through which the optical axis passes, to the inflection point, which is the second closest to the optical axis is denoted by HIF122.

The second lens 120 has positive refractive power and is made of plastic. An object-side surface 122 thereof, which faces the object side, is a convex aspheric surface, and an image-side surface 124 thereof, which faces the image side, is a concave aspheric surface. A profile curve length of the maximum effective half diameter of an object-side surface of the second lens 120 is denoted by ARS21, and a profile curve length of the maximum effective half diameter of the image-side surface of the second lens 120 is denoted by ARS22. A profile curve length of a half of an entrance pupil diameter (HEP) of the object-side surface of the second lens 120 is denoted by ARE21, and a profile curve length of a half of the entrance pupil diameter (HEP) of the image-side surface of the second lens 120 is denoted by ARE22. A thickness of the second lens 120 on the optical axis is TP2.

For the second lens 120, a displacement in parallel with the optical axis from a point on the object-side surface of the second lens, through which the optical axis passes, to the inflection point on the image-side surface, which is the closest to the optical axis is denoted by SGI211, and a displacement in parallel with the optical axis from a point on the image-side surface of the second lens, through which the optical axis passes, to the inflection point on the image-side surface, which is the closest to the optical axis is denoted by SGI221.

For the second lens, a displacement perpendicular to the optical axis from a point on the object-side surface of the second lens, through which the optical axis passes, to the inflection point, which is the closest to the optical axis is denoted by HIF211, and a displacement perpendicular to the optical axis from a point on the image-side surface of the second lens, through which the optical axis passes, to the inflection point, which is the closest to the optical axis is denoted by HIF221.

The third lens 130 has negative refractive power and is made of plastic. An object-side surface 132, which faces the object side, is a convex aspheric surface, and an image-side surface 134, which faces the image side, is a concave aspheric surface. A profile curve length of the maximum effective half diameter of an object-side surface of the third lens 130 is denoted by ARS31, and a profile curve length of the maximum effective half diameter of the image-side surface of the third lens 130 is denoted by ARS32. A profile curve length of a half of an entrance pupil diameter (HEP) of the object-side surface of the third lens 130 is denoted by ARE31, and a profile curve length of a half of the entrance pupil diameter (HEP) of the image-side surface of the third lens 130 is denoted by ARS32. A thickness of the third lens 130 on the optical axis is TP3.

For the third lens 130, SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

For the third lens 130, SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the object-side surface, which is the second closest to the optical axis.

For the third lens 130, HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

For the third lens 130, HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The fourth lens 140 has positive refractive power and is made of plastic. An object-side surface 142, which faces the object side, is a convex aspheric surface, and an image-side surface 144, which faces the image side, is a convex aspheric surface. The object-side surface 142 has an inflection point. A profile curve length of the maximum effective half diameter of an object-side surface of the fourth lens 140 is denoted by ARS41, and a profile curve length of the maximum effective half diameter of the image-side surface of the fourth lens 140 is denoted by ARS42. A profile curve length of a half of an entrance pupil diameter (HEP) of the object-side surface of the fourth lens 140 is denoted by ARE41, and a profile curve length of a half of the entrance pupil diameter (HEP) of the image-side surface of the fourth lens 140 is denoted by ARS42. A thickness of the fourth lens 140 on the optical axis is TP4.

The fourth lens 140 satisfies SGI411=0.0018 mm; |SGI411|/(|SGI411|+TP4)=0.0009, where SGI411 is a displacement in parallel with the optical axis, from a point on the object-side surface of the fourth lens, through which the optical axis passes, to the inflection point on the object-side surface, which is the closest to the optical axis, and SGI421 is a displacement in parallel with the optical axis, from a point on the image-side surface of the fourth lens, through which the optical axis passes, to the inflection point on the image-side surface, which is the closest to the optical axis.

For the fourth lens 140, SGI412 is a displacement in parallel with the optical axis, from a point on the object-side surface of the fourth lens, through which the optical axis passes, to the inflection point on the object-side surface, which is the second closest to the optical axis, and SGI422 is a displacement in parallel with the optical axis, from a point on the image-side surface of the fourth lens, through which the optical axis passes, to the inflection point on the object-side surface, which is the second closest to the optical axis.

The fourth lens 140 further satisfies HIF411=0.7191 mm; HIF411/HOI=0.0959, where HIF411 is a distance perpendicular to the optical axis between the inflection point on the object-side surface of the fourth lens, which is the closest to the optical axis, and the optical axis; HIF421 is a distance perpendicular to the optical axis between the inflection point on the image-side surface of the fourth lens, which is the closest to the optical axis, and the optical axis.

For the fourth lens 140, HIF412 is a distance perpendicular to the optical axis between the inflection point on the object-side surface of the fourth lens, which is the second closest to the optical axis, and the optical axis; HIF422 is a distance perpendicular to the optical axis between the inflection point on the image-side surface of the fourth lens, which is the second closest to the optical axis, and the optical axis.

The fifth lens 150 has positive refractive power and is made of plastic. An object-side surface 152, which faces the object side, is a concave aspheric surface, and an image-side surface 154, which faces the image side, is a convex aspheric surface. The object-side surface 152 and the image-side surface 154 both have an inflection point. A profile curve length of the maximum effective half diameter of an object-side surface of the fifth lens 150 is denoted by ARS51, and a profile curve length of the maximum effective half diameter of the image-side surface of the fifth lens 150 is denoted by ARS52. A profile curve length of a half of an entrance pupil diameter (HEP) of the object-side surface of the fifth lens 150 is denoted by ARE51, and a profile curve length of a half of the entrance pupil diameter (HEP) of the image-side surface of the fifth lens 150 is denoted by ARE52. A thickness of the fifth lens 150 on the optical axis is TP5.

The fifth lens 150 satisfies SGI511=−0.1246 mm; SGI521=−.1477 mm; |SGI511|/(|SGI511|+TP5)=0.0284; |SGI521|/(|SGI521|+TP5)=0.3346, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

For the fifth lens 150, SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the object-side surface, which is the second closest to the optical axis.

The fifth lens 150 further satisfies HIF511=3.8179 mm; HIF521=4.5480 mm; HIF511/HOI=0.5091; HIF521/HOI=0.6065, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

For the fifth lens 150, HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

The sixth lens 160 has negative refractive power and is made of plastic. An object-side surface 162, which faces the object side, is a convex surface, and an image-side surface 164, which faces the image side, is a concave surface. The object-side surface 162 and the image-side surface 164 both have an inflection point. Whereby, incident angle of each field of view for the sixth lens can be effectively adjusted to improve aberration. A profile curve length of the maximum effective half diameter of an object-side surface of the sixth lens 160 is denoted by ARS61, and a profile curve length of the maximum effective half diameter of the image-side surface of the sixth lens 160 is denoted by ARS62. A profile curve length of a half of an entrance pupil diameter (HEP) of the object-side surface of the sixth lens 160 is denoted by ARE61, and a profile curve length of a half of the entrance pupil diameter (HEP) of the image-side surface of the sixth lens 160 is denoted by ARE62. A thickness of the sixth lens 160 on the optical axis is TP6.

The sixth lens 160 satisfies SGI611=0.3208 mm; SGI621=0.5937 mm; |SGI611|/(|SGI611|+TP6)=0.5167; |SGI621|/(|SGI621|+TP6)=0.6643, where SGI611 is a displacement in parallel with the optical axis, from a point on the object-side surface of the sixth lens, through which the optical axis passes, to the inflection point on the object-side surface, which is the closest to the optical axis, and SGI621 is a displacement in parallel with the optical axis, from a point on the image-side surface of the sixth lens, through which the optical axis passes, to the inflection point on the image-side surface, which is the closest to the optical axis.

The sixth lens 160 further satisfies HIF611=1.9655 mm; HIF621=2.0041 mm; HIF611/HOI=0.2621; HIF621/HOI=0.2672, where HIF611 is a distance perpendicular to the optical axis between the inflection point on the object-side surface of the sixth lens, which is the closest to the optical axis, and the optical axis; HIF621 is a distance perpendicular to the optical axis between the inflection point on the image-side surface of the sixth lens, which is the closest to the optical axis, and the optical axis.

The seventh lens 170 has positive refractive power and is made of plastic. An object-side surface 172, which faces the object side, is a convex surface, and an image-side surface 174, which faces the image side, is a concave surface. Whereby, it is helpful to shorten the focal length behind the seventh lens for miniaturization. The object-side surface 172 and the image-side surface 174 both have an inflection point. A profile curve length of the maximum effective half diameter of an object-side surface of the seventh lens 170 is denoted by ARS71, and a profile curve length of the maximum effective half diameter of the image-side surface of the seventh lens 170 is denoted by ARS72. A profile curve length of a half of an entrance pupil diameter (HEP) of the object-side surface of the seventh lens 170 is denoted by ARE71, and a profile curve length of a half of the entrance pupil diameter (REP) of the image-side surface of the seventh lens 170 is denoted by ARE72. A thickness of the seventh lens 170 on the optical axis is TP7.

The seventh lens 170 satisfies SGI711=0.5212 mm; SGI721=0.5668 mm; |SGI711|/(|SGI711|+TP7)=0.3179; |SGI721|/(|SGI721|+TP7)=0.3364, where SGI711 is a displacement in parallel with the optical axis, from a point on the object-side surface of the seventh lens, through which the optical axis passes, to the inflection point on the object-side surface, which is the closest to the optical axis, and SGI721 is a displacement in parallel with the optical axis, from a point on the image-side surface of the seventh lens, through which the optical axis passes, to the inflection point on the image-side surface, which is the closest to the optical axis.

The seventh lens 170 further satisfies HIF711=1.6707 mm; HIF721=1.8616 mm; HIF711/HOI=0.2228; HIF721/HOI=0.2482, where HIF711 is a distance perpendicular to the optical axis between the inflection point on the object-side surface of the seventh lens, which is the closest to the optical axis, and the optical axis; HIF721 is a distance perpendicular to the optical axis between the inflection point on the image-side surface of the seventh lens, which is the closest to the optical axis, and the optical axis.

The features related to the inflection points in the present embodiment described below are obtained with the main reference wavelength 555 nm.

The infrared rays filter 180 is made of glass and between the seventh lens 170 and the image plane 190. The infrared rays filter 180 gives no contribution to the focal length of the system.

The optical image capturing system 10 of the first embodiment has the following parameters, which are f=4.3019 mm; f/HEP=1.2; HAF=59.9968; and tan(HAF)=1.7318, where f is a focal length of the system; HAF is a half of the maximum field angle; and HEP is an entrance pupil diameter.

The parameters of the lenses of the first embodiment are f1=−14.5286 mm; |f/f1|=0.2961; f7=8.2933; |f1|>f7; and |f1/f7|=1.7519, where f1 is a focal length of the first lens 110; and f7 is a focal length of the seventh lens 170.

The first embodiment further satisfies |f2|+|f3|+|f4|+|f5|+|f6|=144.7494; |f1|+|f7|=22.8219 and |f2|+|f3|+|f4|+|f5|+|f6|>|f1|+|f7|, where f2 is a focal length of the second lens 120, f3 is a focal length of the third lens 130, f4 is a focal length of the fourth lens 140, f5 is a focal length of the fifth lens 150, f6 is a focal length of the sixth lens 160, and f7 is a focal length of the seventh lens 170.

The optical image capturing system 10 of the first embodiment further satisfies ΣPPR=f/f2+f/f4+f/f5+f/f7=1.7384; ΣNPR=f/f1+f/f3+f/f6=−0.9999; ΣPPR/|ΣNPR|=1.7386; |f/f2|=0.1774; |f/f3|=0.0443; |f/f4|=0.4411; |f/f5|=0.6012; |f/f6|=0.6595; |f/f7|=0.5187, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system 10 of the first embodiment further satisfies InTL+BFL=HOS; HOS=26.9789 mm; HOI=7.5 mm; HOS/HOI=3.5977; HOS/f=6.2715; InS=12.4615 mm; and InS/HOS=0.4619, where InTL is a distance between the object-side surface 112 of the first lens 110 and the image-side surface 174 of the seventh lens 170; HOS is a height of the image capturing system, i.e. a distance between the object-side surface 112 of the first lens 110 and the image plane 190; InS is a distance between the aperture 100 and the image plane 190; HOI is a half of a diagonal of an effective sensing area of the image sensor 192, i.e., the maximum image height; and BFL is a distance between the image-side surface 174 of the seventh lens 170 and the image plane 190.

The optical image capturing system 10 of the first embodiment further satisfies ΣTP=16.0446 mm; and ΣTP/InTL=0.6559, where ΣTP is a sum of the thicknesses of the lenses 110-170 with refractive power. It is helpful for the contrast of image and yield rate of manufacture and provides a suitable back focal length for installation of other elements.

The optical image capturing system 10 of the first embodiment further satisfies |R1/R2|=129.9952, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R13−R14)/(R13+R14)=−0.0806, where R13 is a radius of curvature of the object-side surface 172 of the seventh lens 170, and R14 is a radius of curvature of the image-side surface 174 of the seventh lens 170. It may modify the astigmatic field curvature.

The optical image capturing system 10 of the first embodiment further satisfies ΣPP=f2+f4+f5+f7=49.4535 mm; and f4/(f2+f4+f5+f7)=0.1972, where ΣPP is a sum of the focal lengths fp of each lens with positive refractive power. It is helpful to share the positive refractive power of the fourth lens 140 to other positive lenses to avoid the significant aberration caused by the incident rays.

The optical image capturing system 10 of the first embodiment further satisfies ΣNP=f1+f3+f6=−118.1178 mm; and f1/(f1+f3+f6)=0.1677, where ΣNP is a sum of the focal lengths fn of each lens with negative refractive power. It is helpful to share the negative refractive power of the first lens 110 to other negative lenses, which avoids the significant aberration caused by the incident rays.

The optical image capturing system 10 of the first embodiment further satisfies IN12=4.5524 mm; IN12/f=1.0582, where IN12 is a distance on the optical axis between the first lens 110 and the second lens 120. It may correct chromatic aberration and improve the performance.

The optical image capturing system 10 of the first embodiment further satisfies TP1=.2761 mm; TP2=0.2398 mm; and (TP1+IN12)/TP2=1.3032, where TP1 is a central thickness of the first lens 110 on the optical axis, and TP2 is a central thickness of the second lens 120 on the optical axis. It may control the sensitivity of manufacture of the system and improve the performance.

The optical image capturing system 10 of the first embodiment further satisfies TP6=0.3000 mm; TP7=1.1182 mm; and (TP7+IN67)/TP6=4.4322, where TP6 is a central thickness of the sixth lens 160 on the optical axis, TP7 is a central thickness of the seventh lens 170 on the optical axis, and IN67 is a distance on the optical axis between the sixth lens 160 and the seventh lens 170. It may control the sensitivity of manufacture of the system and lower the total height of the system.

The optical image capturing system 10 of the first embodiment further satisfies TP3=0.8369 mm; TP4=2.0022 mm; TP5=4.2706 mm; IN34=1.9268 mm; IN45=1.5153 mm; and TP4/(IN34+TP4+IN45)=0.3678, where TP3 is a central thickness of the third lens 130 on the optical axis, TP4 is a central thickness of the fourth lens 140 on the optical axis, TP5 is a central thickness of the fifth lens 150 on the optical axis, IN34 is a distance on the optical axis between the third lens 130 and the fourth lens 140, and IN45 is a distance on the optical axis between the fourth lens 140 and the fifth lens 150. It may control the sensitivity of manufacture of the system and lower the total height of the system.

The optical image capturing system 10 of the first embodiment further satisfies InRS61=−0.7823 mm; InRS62=−0.2166 mm; and |InRS62|/TP6=0.722, where InRS61 is a displacement in parallel with the optical axis from a point on the object-side surface 162 of the sixth lens 160, through which the optical axis passes, to a point at the maximum effective semi diameter of the object-side surface 162 of the sixth lens; InRS62 is a displacement in parallel with the optical axis from a point on the image-side surface 164 of the sixth lens 160, through which the optical axis passes, to a point at the maximum effective semi diameter of the image-side surface 164 of the sixth lens 160; and TP6 is a central thickness of the sixth lens 160 on the optical axis. It is helpful for manufacturing and shaping of the lenses and is helpful to reduce the size.

The optical image capturing system 10 of the first embodiment further satisfies HVT61=3.3498 mm; HVT62=3.9860 mm; and HVT61/HVT62=0.8404, where HVT61 a distance perpendicular to the optical axis between the critical point on the object-side surface 162 of the sixth lens 160 and the optical axis; and HVT62 a distance perpendicular to the optical axis between the critical point on the image-side surface 164 of the sixth lens 160 and the optical axis.

The optical image capturing system 10 of the first embodiment further satisfies InRS71=−0.2756 mm; InRS72=−0.0938 mm; and |InRS72|/TP7=0.0839, where InRS71 is a displacement in parallel with the optical axis from a point on the object-side surface 172 of the seventh lens 170, through which the optical axis passes, to a point at the maximum effective semi diameter of the object-side surface 172 of the seventh lens 170; InRS72 is a displacement in parallel with the optical axis from a point on the image-side surface 174 of the seventh lens 170, through which the optical axis passes, to a point at the maximum effective semi diameter of the image-side surface 174 of the seventh lens 170; and TP7 is a central thickness of the seventh lens 170 on the optical axis. It is helpful for manufacturing and shaping of the lenses and is helpful to reduce the size.

The optical image capturing system 10 of the first embodiment satisfies HVT 71=3.6822 mm; HVT72=4.0606 mm; and HVT71/HVT72=0.9068, where HVT71 a distance perpendicular to the optical axis between the critical point on the object-side surface 172 of the seventh lens 170 and the optical axis; and HVT72 a distance perpendicular to the optical axis between the critical point on the image-side surface 174 of the seventh lens 170 and the optical axis.

The optical image capturing system 10 of the first embodiment satisfies HVT72/HOI=0.5414. It is helpful for correction of the aberration of the peripheral view field of the optical image capturing system.

The optical image capturing system 10 of the first embodiment satisfies HVT72/HOS=0.1505. It is helpful for correction of the aberration of the peripheral view field of the optical image capturing system.

The second lens 120, the third lens 130, and the seventh lens 170 have negative refractive power. The optical image capturing system 10 of the first embodiment further satisfies 1≤NA7/NA2, where NA2 is an Abbe number of the second lens 120; and NA7 is an Abbe number of the seventh lens 170. It may correct the aberration of the optical image capturing system.

The optical image capturing system 10 of the first embodiment further satisfies |TDT|=2.5678%; |ODT|=2.1302%, where TDT is TV distortion; and ODT is optical distortion.

For the fifth lens 150 of the optical image capturing system 10 in the first embodiment, a transverse aberration at 0.7 field of view in the positive direction of the tangential fan after the shortest operation wavelength of visible light passing through the edge of the aperture 100 is denoted by PSTA, and is 0.00040 mm; a transverse aberration at 0.7 field of view in the positive direction of the tangential fan after the longest operation wavelength of visible light passing through the edge of the aperture 100 is denoted by PLTA, and is −0.009 mm; a transverse aberration at 0.7 field of view in the negative direction of the tangential fan after the shortest operation wavelength of visible light passing through the edge of the aperture 100 is denoted by NSTA, and is −0.002 mm; a transverse aberration at 0.7 field of view in the negative direction of the tangential fan after the longest operation wavelength of visible light passing through the edge of the aperture 100 is denoted by NLTA, and is −0.016 mm; a transverse aberration at 0.7 field of view of the sagittal fan after the shortest operation wavelength of visible light passing through the edge of the aperture 100 is denoted by SSTA, and is 0.018 mm; a transverse aberration at 0.7 field of view of the sagittal fan after the longest operation wavelength of visible light passing through the edge of the aperture 100 is denoted by SLTA, and is 0.016 mm.

The parameters of the lenses of the first embodiment are listed in Table 1 and Table 2.

TABLE 1 f = 4.3019 mm; f/HEP = 1.2; HAF = 59.9968 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | $1^{st}$ lens | −1079.499964 | 2.276 | plastic | 1.565 | 58.00 | −14.53 |
| 2 | | 8.304149657 | 4.552 | | | | |
| 3 | $2^{nd}$ lens | 14.39130913 | 5.240 | plastic | 1.650 | 21.40 | 24.25 |
| 4 | | 130.0869482 | 0.162 | | | | |
| 5 | $3^{rd}$ lens | 8.167310118 | 0.837 | plastic | 1.650 | 21.40 | −97.07 |
| 6 | | 6.944477468 | 1.450 | | | | |
| 7 | Aperture | plane | 0.477 | | | | |
| 8 | $4^{th}$ lens | 121.5965254 | 2.002 | plastic | 1.565 | 58.00 | 9.75 |
| 9 | | −5.755749302 | 1.515 | | | | |
| 10 | $5^{th}$ lens | −86.27705938 | 4.271 | plastic | 1.565 | 58.00 | 7.16 |
| 11 | | −3.942936258 | 0.050 | | | | |
| 12 | $6^{th}$ lens | 4.867364751 | 0.300 | plastic | 1.650 | 21.40 | −6.52 |
| 13 | | 2.220604983 | 0.211 | | | | |
| 14 | $7^{th}$ lens | 1.892510651 | 1.118 | plastic | 1.650 | 21.40 | 8.29 |
| 15 | | 2.224128115 | 1.400 | | | | |
| 16 | Infrared rays filter | plane | 0.200 | BK_7 | 1.517 | 64.2 | |
| 17 | | plane | 0.917 | | | | |
| 18 | Image plane | plane | | | | | |

Reference wavelength (d-line): 555 nm.

TABLE 2

Coefficients of the aspheric surfaces

| | Surface | | | | | | |
|---|---|---|---|---|---|---|---|
| | 1 | 2 | 3 | 4 | 5 | 6 | 8 |
| k | 2.500000E+01 | −4.711931E−01 | 1.531617E+00 | −1.153034E+01 | −2.915013E+00 | 4.886991E+00 | −3.459463E+01 |
| A4 | 5.236918E−06 | −2.117558E−04 | 7.146736E−05 | 4.353586E−04 | 5.793768E−04 | −3.756697E−04 | −1.292614E−03 |
| A6 | −3.014384E−08 | −1.838670E−06 | 2.334364E−06 | 1.400287E−05 | 2.112652E−04 | 3.901218E−04 | −1.602381E−05 |
| A8 | −2.487400E−10 | 9.605910E−09 | −7.479362E−08 | −1.688929E−07 | −1.344586E−05 | −4.925422E−05 | −8.452359E−06 |
| A10 | 1.170000E−12 | −8.256000E−11 | 1.701570E−09 | 3.829807E−08 | 1.000482E−06 | 4.139741E−06 | 7.243999E−07 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| | Surface | | | | | | |
|---|---|---|---|---|---|---|---|
| | 9 | 10 | 11 | 12 | 13 | 14 | 15 |
| k | −7.549291E+00 | −5.000000E+01 | −1.740728E+00 | −4.709650E+00 | −4.509781E+00 | −3.427137E+00 | −3.215123E+00 |
| A4 | −5.583548E−03 | 1.240671E−04 | 6.467538E−04 | −1.872317E−03 | −8.967310E−04 | −3.189453E−03 | −2.815022E−03 |
| A6 | 1.947110E−04 | −4.949077E−05 | −4.981838E−05 | −1.523141E−05 | −2.688331E−05 | −1.058126E−05 | 1.884580E−05 |
| A8 | −1.486947E−05 | 2.088854E−06 | 9.129031E−07 | −2.169414E−06 | −8.324958E−07 | 1.760103E−06 | −1.017223E−08 |
| A10 | −6.501246E−08 | −1.438383E−08 | 7.108550E−09 | −2.308304E−08 | −6.184250E−09 | −4.730294E−08 | 3.660000E−12 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

The figures related to the profile curve lengths obtained based on Table 1 and Table 2 are listed in the following table:

First embodiment (Reference wavelength: 555 nm)

| ARE | 1/2(HEP) | ARE value | ARE – 1/2(HEP) | 2(ARE/HEP) % | TP | ARE/TP (%) |
|---|---|---|---|---|---|---|
| 11 | 1.792 | 1.792 | −0.00044 | 99.98% | 2.276 | 78.73% |
| 12 | 1.792 | 1.806 | 0.01319 | 100.74% | 2.276 | 79.33% |
| 21 | 1.792 | 1.797 | 0.00437 | 100.24% | 5.240 | 34.29% |
| 22 | 1.792 | 1.792 | −0.00032 | 99.98% | 5.240 | 34.20% |
| 31 | 1.792 | 1.808 | 0.01525 | 100.85% | 0.837 | 216.01% |
| 32 | 1.792 | 1.819 | 0.02705 | 101.51% | 0.837 | 217.42% |
| 41 | 1.792 | 1.792 | −0.00041 | 99.98% | 2.002 | 89.50% |
| 42 | 1.792 | 1.825 | 0.03287 | 101.83% | 2.002 | 91.16% |
| 51 | 1.792 | 1.792 | −0.00031 | 99.98% | 4.271 | 41.96% |
| 52 | 1.792 | 1.845 | 0.05305 | 102.96% | 4.271 | 43.21% |
| 61 | 1.792 | 1.818 | 0.02587 | 101.44% | 0.300 | 606.10% |
| 62 | 1.792 | 1.874 | 0.08157 | 104.55% | 0.300 | 624.67% |
| 71 | 1.792 | 1.898 | 0.10523 | 105.87% | 1.118 | 169.71% |
| 72 | 1.792 | 1.885 | 0.09273 | 105.17% | 1.118 | 168.59% |

| ARS | EHD | ARS value | ARS – EHD | (ARS/EHD) % | TP | ARS/TP (%) |
|---|---|---|---|---|---|---|
| 11 | 15.095 | 15.096 | 0.001 | 100.01% | 2.276 | 663.24% |
| 12 | 10.315 | 11.377 | 1.062 | 110.29% | 2.276 | 499.86% |
| 21 | 7.531 | 8.696 | 1.166 | 115.48% | 5.240 | 165.96% |
| 22 | 4.759 | 4.881 | 0.122 | 102.56% | 5.240 | 93.15% |
| 31 | 3.632 | 4.013 | 0.382 | 110.51% | 0.837 | 479.55% |
| 32 | 2.815 | 3.159 | 0.344 | 112.23% | 0.837 | 377.47% |
| 41 | 2.967 | 2.971 | 0.004 | 100.13% | 2.002 | 148.38% |
| 42 | 3.402 | 3.828 | 0.426 | 112.53% | 2.002 | 191.20% |
| 51 | 4.519 | 4.523 | 0.004 | 100.10% | 4.271 | 105.91% |
| 52 | 5.016 | 5.722 | 0.706 | 114.08% | 4.271 | 133.99% |
| 61 | 5.019 | 5.823 | 0.805 | 116.04% | 0.300 | 1941.14% |
| 62 | 5.629 | 6.605 | 0.976 | 117.34% | 0.300 | 2201.71% |
| 71 | 5.634 | 6.503 | 0.869 | 115.43% | 1.118 | 581.54% |
| 72 | 6.488 | 7.152 | 0.664 | 110.24% | 1.118 | 639.59% |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

[Second Embodiment]

Figure 2A:
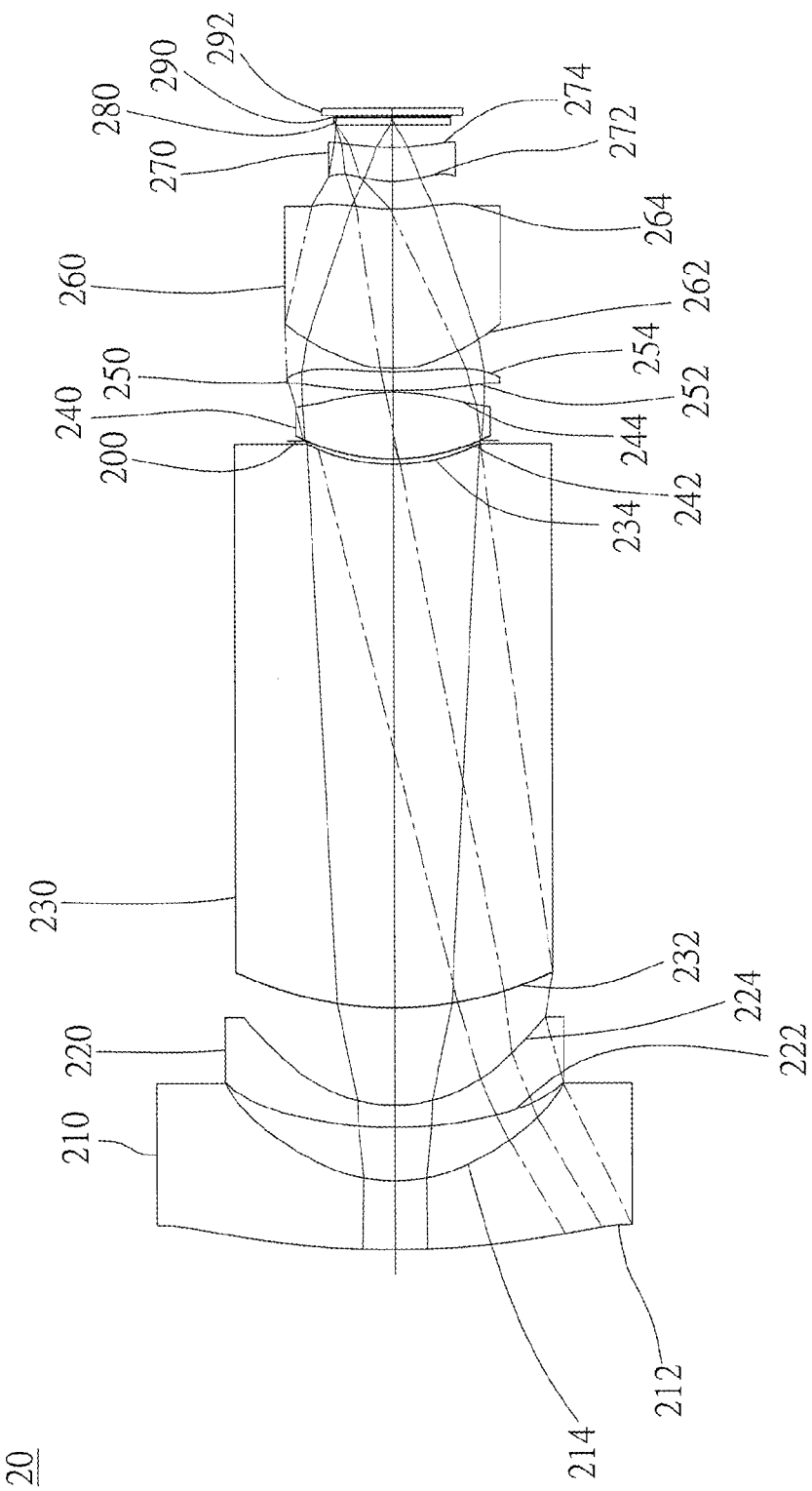
FIG. 2A is a schematic diagram of a second embodiment of the present invention.
Figure 2B:
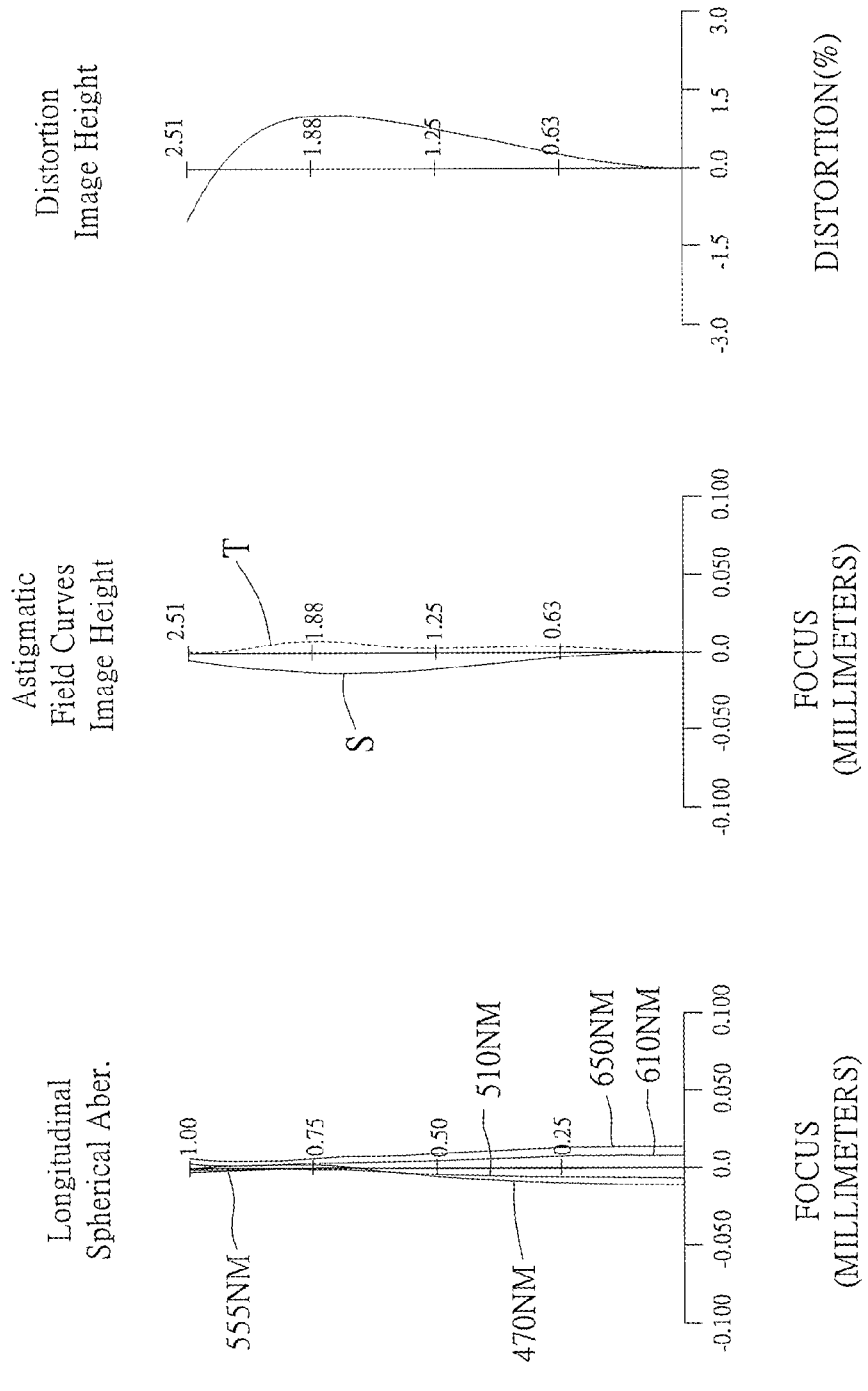
FIG. 2B shows curve diagrams of longitudinal spherical aberration, astigmatic field, and optical distortion of the optical image capturing system in the order from left to right of the second embodiment of the present application.
Figure 2C:
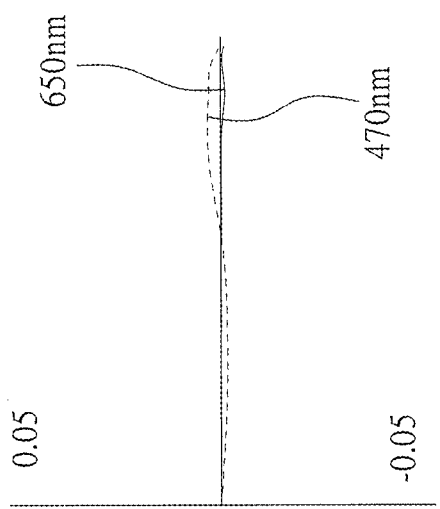
FIG. 2C shows a tangential fan and a sagittal fan of the optical image capturing system of the second embodiment of the present application, and a transverse aberration diagram at 0.7 field of view when a longest operation wavelength and a shortest operation wavelength pass through an edge of an aperture.
Figure 2C:
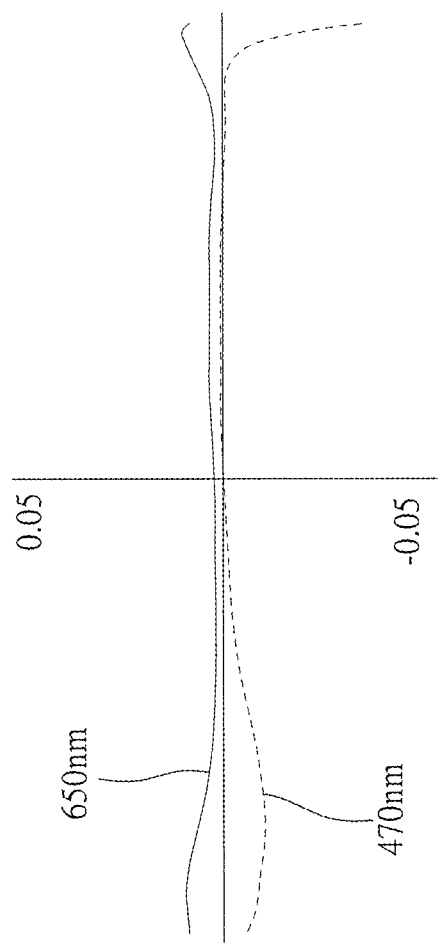

As shown in FIG. 2A and FIG. 2B, an optical image capturing system 20 of the second embodiment of the present invention includes, along an optical axis from an object side to an image side, a first lens 210, a second lens 220, a third lens 230, an aperture 200, a fourth lens 240, a fifth lens 250, a sixth lens 260, a seven lens 270, an infrared rays filter 280, an image plane 290, and an image sensor 292. FIG. 2C is a transverse aberration diagram at 0.7 field of view of the second embodiment of the present application.

The first lens 210 has negative refractive power and is made of plastic. An object-side surface 212 thereof, which faces the object side, is a convex aspheric surface, and an image-side surface 214 thereof, which faces the image side, is a concave aspheric surface. The object-side surface 212 has an inflection point.

The second lens 220 has negative refractive power and is made of plastic. An object-side surface 222 thereof, which faces the object side, is a convex aspheric surface, and an image-side surface 224 thereof, which faces the image side, is a concave aspheric surface. The image-side surface 224 has an inflection point.

The third lens 230 has positive refractive power and is made of plastic. An object-side surface 232, which faces the object side, is a convex aspheric surface, and an image-side surface 234, which faces the image side, is a concave aspheric surface.

The fourth lens 240 has positive refractive power and is made of plastic. An object-side surface 242, which faces the object side, is a convex aspheric surface, and an image-side surface 244, which faces the image side, is a convex aspheric surface. The image-side surface 244 has an inflection point.

The fifth lens 250 has negative refractive power and is made of plastic. An object-side surface 252, which faces the object side, is a convex aspheric surface, and an image-side surface 254, which faces the image side, is a concave aspheric surface. The object-side surface 252 and the image-side surface 254 both have an inflection point.

The sixth lens 260 has positive refractive power and is made of plastic. An object-side surface 262, which faces the object side, is a convex aspheric surface, and an image-side surface 264, which faces the image side, is a concave aspheric surface. The object-side surface 262 and the image-side surface 264 both have an inflection point. Whereby, incident angle of each field of view for the sixth lens can be effectively adjusted to improve aberration.

The seventh lens 270 has positive refractive power and is made of plastic. An object-side surface 272, which faces the object side, is a convex surface, and an image-side surface 274, which faces the image side, is a concave surface. It may help to shorten the back focal length to keep small in size. In addition, the object-side surface 272 has an inflection point, and the image-side surface 274 has two inflection points, which may reduce an incident angle of the light of an off-axis field of view and correct the aberration of the off-axis field of view.

The infrared rays filter 280 is made of glass and between the seventh lens 270 and the image plane 290. The infrared rays filter 280 gives no contribution to the focal length of the system.

The parameters of the lenses of the second embodiment are listed in Table 3 and Table 4.

TABLE 3 f = 2.7563 mm; f/HEP = 1.0; HAF = 42.4988 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | 1st lens | 40.41249203 | 3.042 | plastic | 1.565 | 58.00 | −14.350 |
| 2 | | 6.586358416 | 2.365 | | | | |
| 3 | 2nd lens | 18.46578026 | 0.985 | plastic | 1.565 | 58.00 | −17.593 |
| 4 | | 6.349922424 | 4.301 | | | | |
| 5 | 3rd lens | 13.92765414 | 24.086 | plastic | 1.661 | 20.40 | 42.374 |

TABLE 3-continued f = 2.7563 mm; f/HEP = 1.0; HAF = 42.4988 deg

| Surface | | Radius of curvature (mm) | Thickness (mm) | Material | Refractive index | Abbe number | Focal length (mm) |
|---|---|---|---|---|---|---|---|
| 6 | | 8.464447443 | 1.000 | | | | |
| 7 | Aperture | 1E+18 | −0.778 | | | | |
| 8 | 4$^{th}$ lens | 10.59574021 | 2.933 | plastic | 1.565 | 58.00 | 8.557 |
| 9 | | −8.048610938 | 0.056 | | | | |
| 10 | 5$^{th}$ lens | 37.98822909 | 0.821 | plastic | 1.514 | 56.80 | −48.745 |
| 11 | | 15.01553903 | 0.146 | | | | |
| 12 | 6$^{th}$ lens | 4.736016366 | 7.040 | plastic | 1.565 | 58.00 | 11.227 |
| 13 | | 8.559828064 | 1.204 | | | | |
| 14 | 7$^{th}$ lens | 3.955652734 | 1.499 | plastic | 1.583 | 30.20 | 12.843 |
| 15 | | 7.163997144 | 1.000 | | | | |
| 16 | Infrared rays filter | 1E+18 | 0.300 | BK_7 | 1.517 | 64.2 | |
| 17 | | 1E+18 | 0.001 | | | | |
| 18 | Image plane | 1E+18 | −0.001 | | | | |

Reference wavelength (d-line): 555 nm.

TABLE 4

Coefficients of the aspheric surfaces

| | Surface | | | | | | |
|---|---|---|---|---|---|---|---|
| | 1 | 2 | 3 | 4 | 5 | 6 | 8 |
| k | 6.814651E+00 | −4.044649E−01 | 1.810518E+00 | −3.249122E−01 | 2.976839E−01 | −4.126956E+00 | 3.557145E+00 |
| A4 | 1.011494E−05 | −4.240339E−04 | 2.281695E−05 | 1.981622E−04 | −1.660907E−04 | 8.397415E−04 | 2.631122E−05 |
| A6 | −2.880361E−07 | −2.039976E−07 | −4.509313E−07 | −1.264682E−06 | 7.069433E−07 | 3.113318E−05 | 2.527551E−05 |
| A8 | 9.893337E−10 | 1.655061E−08 | 1.361977E−08 | −7.945038E−08 | −5.011125E−09 | −4.187825E−06 | −2.380965E−06 |
| A10 | −2.698026E−11 | 3.710265E−10 | 6.249133E−10 | −3.031123E−09 | 4.723740E−10 | 1.070484E−07 | 9.365903E−09 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| | Surface | | | | | | |
|---|---|---|---|---|---|---|---|
| | 9 | 10 | 11 | 12 | 13 | 14 | 15 |
| k | −7.074326E+00 | 4.108126E+01 | −2.022664E+01 | −9.179888E−01 | −2.462068E+01 | −2.078540E+00 | −5.474787E+00 |
| A4 | 6.727906E−05 | 9.412696E−04 | −1.578524E−03 | −9.873721E−04 | 1.977295E−04 | −6.288823E−03 | −3.464733E−03 |
| A6 | 2.386804E−05 | −2.539142E−05 | −1.053657E−05 | 8.710337E−06 | −2.236006E−04 | −1.613961E−04 | −9.899436E−04 |
| A8 | 5.198553E−07 | −7.323171E−07 | 1.078326E−06 | 8.722141E−07 | −1.000943E−05 | −2.037892E−04 | 1.004753E−04 |
| A10 | −2.718609E−08 | −1.616325E−08 | −5.315433E−08 | −3.611276E−08 | 9.853105E−07 | 1.899944E−05 | 9.743928E−06 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

An equation of the aspheric surfaces of the second embodiment is the same as that of the first embodiment, and the definitions are the same as well.

The exact parameters of the second embodiment based on Table 3 and Table 4 are listed in the following table:

Second embodiment (Reference wavelength: 555 nm)

| |f/f1| | |f/f2| | |f/f3| | |f/f4| | |f/f5| | |f/f6| |
|---|---|---|---|---|---|
| 0.1921 | 0.1567 | 0.0650 | 0.3221 | 0.0565 | 0.2455 |

| |f/f7| | ΣPPR | ΣNPR | ΣPPR/|ΣNPR| | IN12/f | IN67/f |
|---|---|---|---|---|---|
| 0.2146 | 0.8247 | 0.4278 | 1.9276 | 0.8580 | 0.4370 |

| |f1/f2| | |f2/f3| | (TP1 + IN12)/TP2 | | (TP7 + IN67)/TP6 | |
|---|---|---|---|---|---|
| 0.8157 | 0.4152 | 5.4862 | | 0.3840 | |

Second embodiment (Reference wavelength: 555 nm)

| HOS | InTL | HOS/HOI | InS/HOS | ODT % | TDT % |
|---|---|---|---|---|---|
| 50.0002 | 48.7000 | 20.0001 | 0.2844 | 1.0513 | 2.0484 |
| HVT11 | HVT12 | HVT21 | HVT22 | HVT31 | HVT32 |
| 10.0958 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 2.6527 | 2.1797 | 0.0000 | 0.0000 | 0.0000 |
| PSTA | PLTA | NSTA | NLTA | SSTA | SLTA |
| −0.034 mm | 0.008 mm | −0.006 mm | 0.008 mm | 0.001 mm | −0.001 mm |

The figures related to the profile curve lengths obtained based on Table 3 and Table 4 are listed in the following table:

Second embodiment (Reference wavelength: 555 nm)

| ARE | 1/2(HEP) | ARE value | ARE − 1/2(HEP) | 2(ARE/HEP) % | TP | ARE/TP (%) |
|---|---|---|---|---|---|---|
| 11 | 1.378 | 1.378 | 0.00014 | 100.01% | 3.042 | 45.32% |
| 12 | 1.378 | 1.388 | 0.00977 | 100.71% | 3.042 | 45.63% |
| 21 | 1.378 | 1.379 | 0.00117 | 100.08% | 0.985 | 139.97% |
| 22 | 1.378 | 1.389 | 0.01094 | 100.79% | 0.985 | 140.96% |
| 31 | 1.378 | 1.380 | 0.00209 | 100.15% | 24.086 | 5.73% |
| 32 | 1.378 | 1.384 | 0.00606 | 100.44% | 24.086 | 5.75% |
| 41 | 1.378 | 1.382 | 0.00396 | 100.29% | 2.933 | 47.12% |
| 42 | 1.378 | 1.384 | 0.00589 | 100.43% | 2.933 | 47.18% |
| 51 | 1.378 | 1.378 | 0.00029 | 100.02% | 0.821 | 167.96% |
| 52 | 1.378 | 1.379 | 0.00127 | 100.09% | 0.821 | 168.08% |
| 61 | 1.378 | 1.397 | 0.01838 | 101.33% | 7.040 | 19.84% |
| 62 | 1.378 | 1.382 | 0.00417 | 100.30% | 7.040 | 19.63% |
| 71 | 1.378 | 1.397 | 0.01913 | 101.39% | 1.499 | 93.22% |
| 72 | 1.378 | 1.383 | 0.00526 | 100.38% | 1.499 | 92.30% |

Second embodiment (Reference wavelength: 555 nm)

| ARS | EHD | ARS value | ARS − EHD | (ARS/EHD) % | TP | ARS/TP (%) |
|---|---|---|---|---|---|---|
| 11 | 10.187 | 10.260 | 0.073 | 100.72% | 3.042 | 337.34% |
| 12 | 7.257 | 8.788 | 1.531 | 121.10% | 3.042 | 288.93% |
| 21 | 7.260 | 7.680 | 0.420 | 105.78% | 0.985 | 779.33% |
| 22 | 6.471 | 7.826 | 1.355 | 120.94% | 0.985 | 794.12% |
| 31 | 6.787 | 7.033 | 0.246 | 103.63% | 24.086 | 29.20% |
| 32 | 3.744 | 3.878 | 0.134 | 103.57% | 24.086 | 16.10% |
| 41 | 3.834 | 3.958 | 0.124 | 103.23% | 2.933 | 134.94% |
| 42 | 4.173 | 4.235 | 0.062 | 101.49% | 2.933 | 144.37% |
| 51 | 4.488 | 4.505 | 0.017 | 100.39% | 0.821 | 548.95% |
| 52 | 4.543 | 4.610 | 0.067 | 101.48% | 0.821 | 561.74% |
| 61 | 4.618 | 5.102 | 0.484 | 110.48% | 7.040 | 72.47% |
| 62 | 3.458 | 3.477 | 0.019 | 100.54% | 7.040 | 49.38% |
| 71 | 2.716 | 2.759 | 0.043 | 101.60% | 1.499 | 184.10% |
| 72 | 2.472 | 2.486 | 0.015 | 100.60% | 1.499 | 165.89% |

The results of the equations of the second embodiment based on Table 3 and Table 4 are listed in the following table:

Values related to the inflection points of the second embodiment
(Reference wavelength: 555 nm)

| HIF111 | 7.6721 | HIF111/HOI | 3.0689 | SGI111 | 0.7575 | |SGI111|/(|SGI111| + TP1) | 0.1994 |
|---|---|---|---|---|---|---|---|
| HIF221 | 5.9990 | HIF221/HOI | 2.3996 | SGI221 | 3.3575 | |SGI221|/(|SGI221| + TP2) | 0.7731 |
| HIF421 | 2.7921 | HIF421/HOI | 1.1168 | SGI421 | −0.4017 | |SGI421|/(|SGI421| + TP4) | 0.1205 |
| HIF511 | 3.3357 | HIF511/HOI | 1.3343 | SGI511 | 0.2283 | |SGI511|/(|SGI511| + TP5) | 0.2177 |
| HIF521 | 1.5971 | HIF521/HOI | 0.6389 | SGI521 | 0.0704 | |SGI521|/(|SGI521| + TP5) | 0.0790 |
| HIF611 | 4.4060 | HIF611/HOI | 1.7624 | SGI611 | 1.8032 | |SGI611|/(|SGI611| + TP6) | 0.2039 |
| HIF621 | 1.6241 | HIF621/HOI | 0.6496 | SGI621 | 0.1275 | |SGI621|/(|SGI621| + TP6) | 0.0178 |
| HIF711 | 1.3656 | HIF711/HOI | 0.5462 | SGI711 | 0.2036 | |SGI711|/(|SGI711| + TP7) | 0.1196 |
| HIF721 | 1.2691 | HIF721/HOI | 0.5077 | SGI721 | 0.0964 | |SGI721|/(|SGI721| + TP7) | 0.0604 |
| HIF722 | 1.9562 | HIF722/HOI | 0.7825 | SGI722 | 0.1712 | |SGI722|/(|SGI722| + TP7) | 0.1025 |

[Third Embodiment]

Figure 3A:
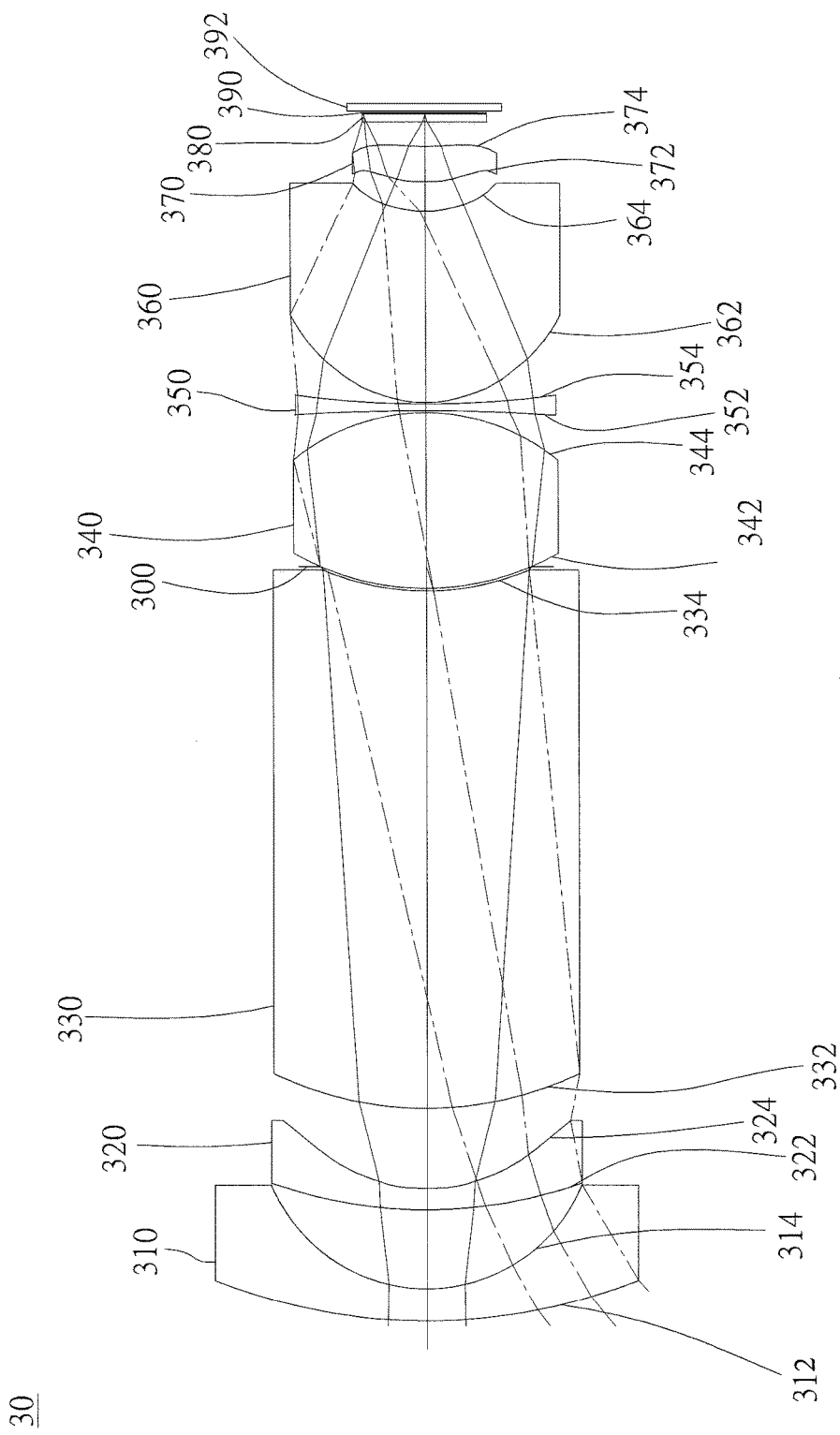
FIG. 3A is a schematic diagram of a third embodiment of the present invention.
Figure 3:
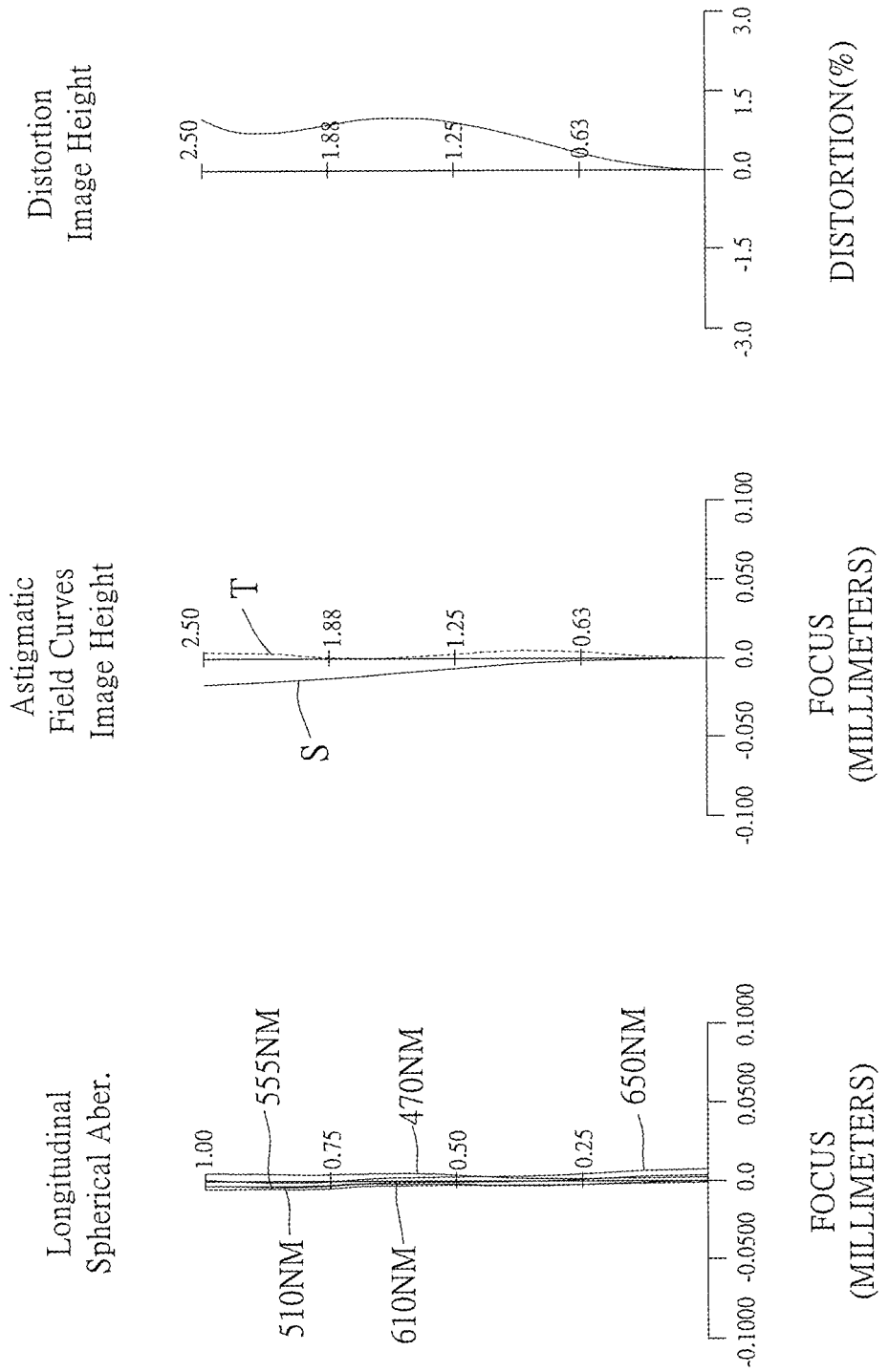
FIG. 3B shows curve diagrams of longitudinal spherical aberration, astigmatic field, and optical distortion of the optical image capturing system in the order from left to right of the third embodiment of the present application.
FIG. 3C shows a tangential fan and a sagittal fan of the optical image capturing system of the third embodiment of the present application, and a transverse aberration diagram at 0.7 field of view when a longest operation wavelength and a shortest operation wavelength pass through an edge of an aperture.
Figure 3C:
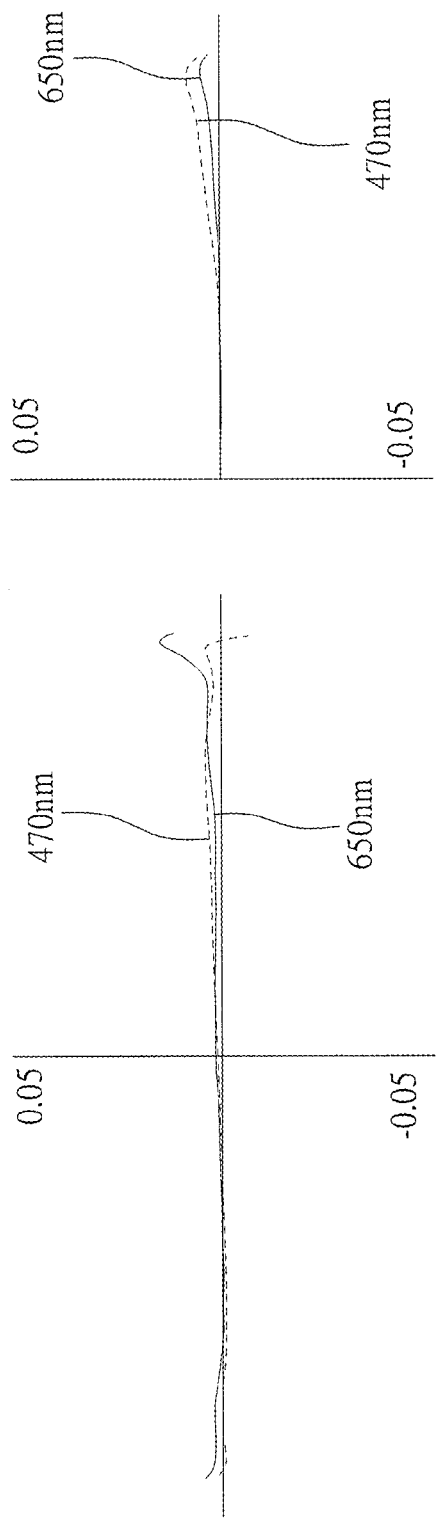

As shown in FIG. 3A and FIG. 3B, an optical image capturing system of the third embodiment of the present invention includes, along an optical axis from an object side to an image side, a first lens 310, a second lens 320, a third lens 330, an aperture 300, a fourth lens 340, a fifth lens 350, a sixth lens 360, a seventh lens 370, an infrared rays filter 380, an image plane 390, and an image sensor 392. FIG. 3C is a transverse aberration diagram at 0.7 field of view of the third embodiment of the present application.

The first lens 310 has negative refractive power and is made of plastic. An object-side surface 312 thereof, which faces the object side, is a concave aspheric surface, and an image-side surface 314 thereof, which faces the image side, is a convex aspheric surface.

The second lens 320 has negative refractive power and is made of plastic. An object-side surface 322 thereof, which faces the object side, is a convex aspheric surface, and an image-side surface 324 thereof, which faces the image side, is a concave aspheric surface. The image-side surface 324 has an inflection point.

The third lens 330 has positive refractive power and is made of plastic. An object-side surface 332 thereof, which faces the object side, is a convex aspheric surface, and an image-side surface 334 thereof, which faces the image side, is a concave aspheric surface.

The fourth lens 340 has positive refractive power and is made of plastic. An object-side surface 342, which faces the object side, is a convex aspheric surface, and an image-side surface 344, which faces the image side, is a convex aspheric surface.

The fifth lens 350 has negative refractive power and is made of plastic. An object-side surface 352, which faces the object side, is a convex aspheric surface, and an image-side surface 354, which faces the image side, is a concave aspheric surface. The object-side surface 352 has an inflection point.

The sixth lens 360 has positive refractive power and is made of plastic. An object-side surface 362, which faces the object side, is a convex aspheric surface, and an image-side surface 364, which faces the image side, is a concave aspheric surface. Whereby, incident angle of each field of view for the sixth lens can be effectively adjusted to improve aberration.

The seventh lens 370 has positive refractive power and is made of plastic. An object-side surface 372, which faces the object side, is a convex surface, and an image-side surface 374, which faces the image side, is a concave surface. It may help to shorten the back focal length to keep small in size. In addition, the object-side surface 372 and the image-side surface 374 both have an inflection point, which may reduce an incident angle of the light of an off-axis field of view and correct the aberration of the off-axis field of view.

The infrared rays filter 380 is made of glass and between the seventh lens 370 and the image plane 390. The infrared rays filter 390 gives no contribution to the focal length of the system.

The parameters of the lenses of the third embodiment are listed in Table 5 and Table 6.

TABLE 5 f = 3.2262 mm; f/HEP = 1.0; HAF = 37.4996 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | $1^{st}$ lens | 23.95864736 | 1.297 | plastic | 1.565 | 58.00 | −14.478 |
| 2 | | 5.992597791 | 3.323 | | | | |
| 3 | $2^{nd}$ lens | 20.63941977 | 0.860 | plastic | 1.565 | 58.00 | −17.513 |
| 4 | | 6.601472449 | 3.313 | | | | |
| 5 | $3^{rd}$ lens | 14.27378118 | 21.473 | plastic | 1.661 | 20.40 | 44.858 |
| 6 | | 10.87157017 | 1.011 | | | | |
| 7 | Aperture | 1E+18 | −0.955 | | | | |
| 8 | $4^{th}$ lens | 8.940829904 | 7.366 | plastic | 1.565 | 58.00 | 9.394 |
| 9 | | −9.240354508 | 0.050 | | | | |
| 10 | $5^{th}$ lens | 416.7872696 | 0.300 | plastic | 1.661 | 20.40 | −58.934 |
| 11 | | 35.90119795 | 0.050 | | | | |
| 12 | $6^{th}$ lens | 5.480558281 | 7.935 | plastic | 1.565 | 58.00 | 20.434 |
| 13 | | 4.954999519 | 1.199 | | | | |
| 14 | $7^{th}$ lens | 4.661821736 | 1.477 | plastic | 1.565 | 58.00 | 11.044 |
| 15 | | 16.17088539 | 1.000 | | | | |
| 16 | Infrared rays filter | 1E+18 | 0.300 | BK_7 | 1.517 | 64.2 | |
| 17 | | 1E+18 | 0.003 | | | | |
| 18 | Image plane | 1E+18 | −0.003 | | | | |

Reference wavelength (d-line): 555 nm.

TABLE 6

Coefficients of the aspheric surfaces

| | Surface | | | | | | |
|---|---|---|---|---|---|---|---|
| | 1 | 2 | 3 | 4 | 5 | 6 | 8 |
| k | 3.747100E+00 | −3.001143E−01 | 3.499667E+00 | −3.534181E−01 | 1.349835E+00 | −3.364260E−01 | −1.358782E+00 |
| A4 | 8.377367E−06 | −2.291188E−04 | −1.233213E−05 | 5.579657E−05 | −1.338106E−04 | −2.631633E−04 | −1.409107E−04 |
| A6 | −4.622767E−07 | 9.454693E−08 | 2.611459E−07 | −5.499508E−06 | 6.276608E−08 | 5.444066E−06 | −6.724192E−06 |
| A8 | −3.461925E−09 | 6.523069E−08 | −1.353632E−08 | 1.792546E−08 | 4.305331E−08 | −6.756950E−08 | 1.772319E−07 |
| A10 | −3.969907E−12 | −1.545646E−09 | −1.663205E−10 | −3.650659E−09 | −5.934464E−10 | 1.790256E−08 | 2.105133E−09 |

TABLE 6-continued

| Coefficients of the aspheric surfaces | | | | | | |
|---|---|---|---|---|---|---|
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| | Surface | | | | | | |
|---|---|---|---|---|---|---|---|
| | 9 | 10 | 11 | 12 | 13 | 14 | 15 |
| k | 4.606561E−01 | 5.000000E+01 | 3.891651E+01 | −2.573300E−01 | −3.401933E+00 | 1.604584E−01 | −5.000000E+01 |
| A4 | −5.006447E−05 | −2.894463E−04 | −1.000502E−04 | 2.021615E−06 | 3.437801E−03 | −4.162403E−03 | 4.238849E−04 |
| A6 | −8.619704E−07 | 1.270856E−06 | −3.195582E−06 | −5.389780E−06 | 6.596214E−05 | −3.249781E−04 | −1.236021E−03 |
| A8 | 7.171987E−08 | 4.244776E−09 | −1.517354E−07 | −3.072757E−08 | 1.576595E−05 | −5.816681E−06 | 5.408547E−05 |
| A10 | −3.073243E−09 | −6.199731E−10 | 9.374921E−10 | −1.470649E−09 | −1.424655E−07 | −3.890479E−06 | −4.169966E−07 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

An equation of the aspheric surfaces of the third embodiment is the same as that of the first embodiment, and the definitions are the same as well.

The exact parameters of the third embodiment based on Table 5 and Table 6 are listed in the following table:

| Third embodiment (Reference wavelength: 555 nm) | | | | | |
|---|---|---|---|---|---|
| $|f/f1|$ | $|f/f2|$ | $|f/f3|$ | $|f/f4|$ | $|f/f5|$ | $|f/f6|$ |
| 0.2228 | 0.1842 | 0.0719 | 0.3434 | 0.0547 | 0.1579 |
| $|f/f7|$ | ΣPPR | ΣNPR | ΣPPR/|ΣNPR| | IN12/f | IN67/f |
| 0.2921 | 0.7961 | 0.5311 | 1.4989 | 1.0300 | 0.3717 |
| $|f1/f2|$ | $|f2/f3|$ | (TP1 + IN12)/TP2 | | (TP7 + IN67)/TP6 | |
| 0.8267 | 0.3904 | 5.3732 | | 0.3373 | |
| HOS | InTL | HOS/HOI | InS/HOS | ODT % | TDT % |
| 50.0000 | 48.7000 | 20.0000 | 0.3745 | 1.0236 | 0.2962 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 2.5311 | 1.7250 | 0.6900 | 0.0345 |
| PSTA | PLTA | NSTA | NLTA | SSTA | SLTA |
| −0.007 mm | 0.013 mm | 0.001 mm | 0.005 mm | 0.006 mm | 0.003 mm |

The figures related to the profile curve lengths obtained based on Table 5 and Table 6 are listed in the following table:

| Third embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.613 | 1.614 | 0.00113 | 100.07% | 1.297 | 124.45% |
| 12 | 1.613 | 1.633 | 0.01943 | 101.20% | 1.297 | 125.87% |
| 21 | 1.613 | 1.615 | 0.00155 | 100.10% | 0.860 | 187.78% |
| 22 | 1.613 | 1.629 | 0.01623 | 101.01% | 0.860 | 189.49% |
| 31 | 1.613 | 1.616 | 0.00330 | 100.20% | 21.473 | 7.53% |
| 32 | 1.613 | 1.619 | 0.00564 | 100.35% | 21.473 | 7.54% |
| 41 | 1.613 | 1.621 | 0.00839 | 100.52% | 7.366 | 22.01% |
| 42 | 1.613 | 1.621 | 0.00832 | 100.52% | 7.366 | 22.01% |
| 51 | 1.613 | 1.613 | −0.00011 | 99.99% | 0.300 | 537.67% |
| 52 | 1.613 | 1.614 | 0.00043 | 100.03% | 0.300 | 537.85% |

-continued

| Third embodiment (Reference wavelength: 555 nm) | | | | | | |
|---|---|---|---|---|---|---|
| 61 | 1.613 | 1.637 | 0.02377 | 101.47% | 7.935 | 20.63% |
| 62 | 1.613 | 1.644 | 0.03066 | 101.90% | 7.935 | 20.72% |
| 71 | 1.613 | 1.638 | 0.02538 | 101.57% | 1.477 | 110.91% |
| 72 | 1.613 | 1.614 | 0.00105 | 100.07% | 1.477 | 109.26% |

| ARS | EHD | ARS value | ARS − EHD | (ARS/EHD)% | TP | ARS/TP (%) |
|---|---|---|---|---|---|---|
| 11 | 8.821 | 9.042 | 0.221 | 102.51% | 1.297 | 697.14% |
| 12 | 6.426 | 8.204 | 1.778 | 127.67% | 1.297 | 632.52% |
| 21 | 6.426 | 6.547 | 0.121 | 101.89% | 0.860 | 761.39% |
| 22 | 6.426 | 6.793 | 0.810 | 113.54% | 0.860 | 790.04% |
| 31 | 6.358 | 6.584 | 0.226 | 103.56% | 21.473 | 30.66% |
| 32 | 4.323 | 4.437 | 0.113 | 102.62% | 21.473 | 20.66% |
| 41 | 4.373 | 4.509 | 0.136 | 103.12% | 7.366 | 61.21% |
| 42 | 5.516 | 6.022 | 0.505 | 109.16% | 7.366 | 81.75% |
| 51 | 5.301 | 5.307 | 0.007 | 100.13% | 0.300 | 1769.07% |
| 52 | 5.293 | 5.307 | 0.014 | 100.27% | 0.300 | 1769.10% |
| 61 | 5.591 | 6.990 | 1.398 | 125.01% | 7.935 | 88.09% |
| 62 | 2.968 | 3.275 | 0.307 | 110.34% | 7.935 | 41.27% |
| 71 | 2.886 | 2.949 | 0.063 | 102.18% | 1.477 | 199.60% |
| 72 | 2.959 | 3.033 | 0.074 | 102.51% | 1.477 | 205.31% |

The results of the equations of the third embodiment based on Table 5 and Table 6 are listed in the following table:

| Values related to the inflection points of the third embodiment (Reference wavelength: 555 nm) | | | | | | | |
|---|---|---|---|---|---|---|---|
| HIF221 | 5.4742 | HIF221/HOI | 2.1897 | SGI221 | 2.4294 | \|SGI221\|/(\|SGI221\| + TP2) | 0.7386 |
| HIF511 | 0.8343 | HIF511/HOI | 0.3337 | SGI511 | 0.0007 | \|SGI511\|/(\|SGI511\| + TP5) | 0.0023 |
| HIF711 | 1.7410 | HIF711/HOI | 0.6964 | SGI711 | 0.2907 | \|SGI711\|/(\|SGI711\| + TP7) | 0.1644 |
| HIF721 | 1.1145 | HIF721/HOI | 0.4458 | SGI721 | 0.0348 | \|SGI721\|/(\|SGI721\| + TP7) | 0.0230 |

[Fourth Embodiment]

Figure 4A:
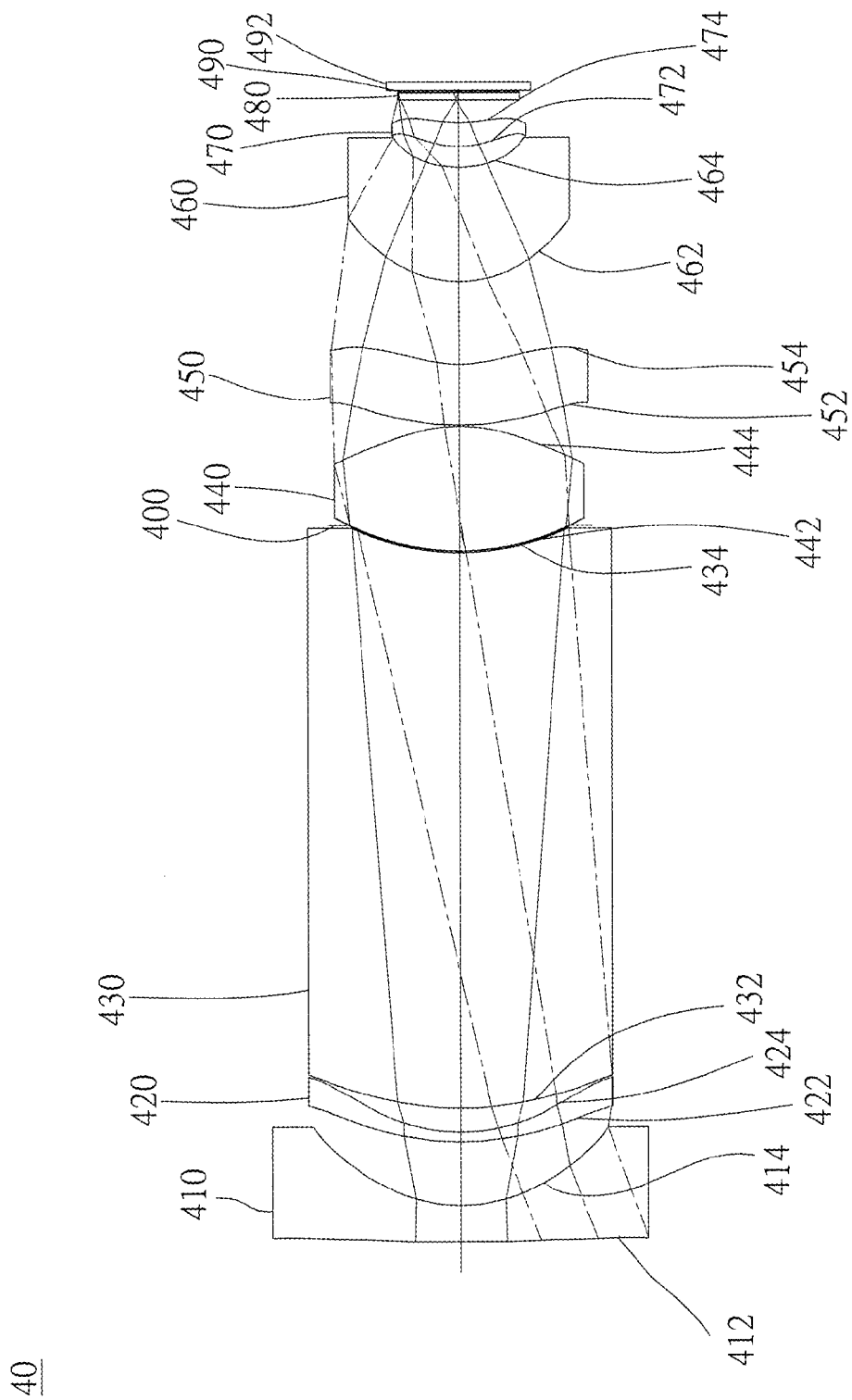
FIG. 4A is a schematic diagram of a fourth embodiment of the present invention.
Figure 4B:
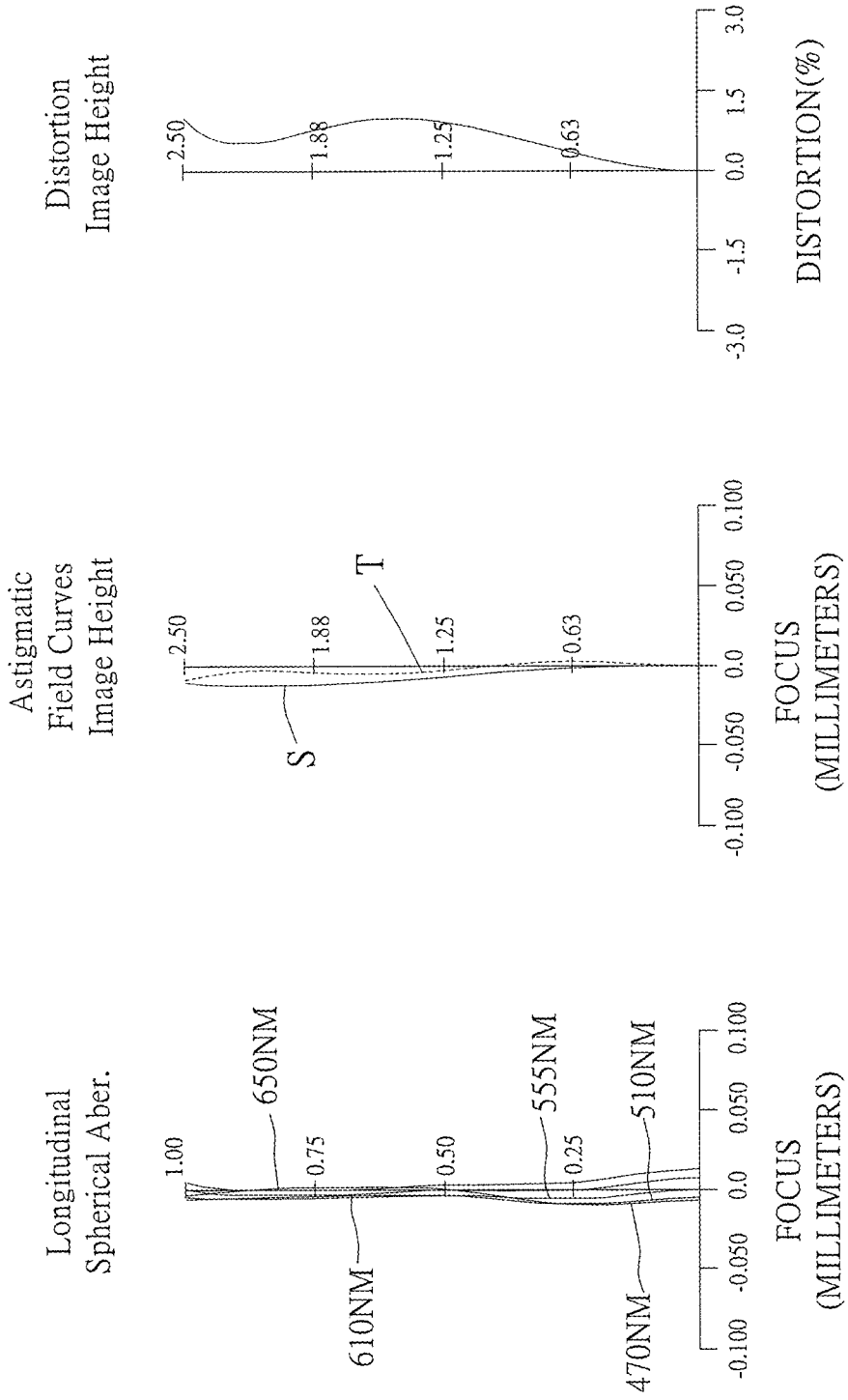
FIG. 4B shows curve diagrams of longitudinal spherical aberration, astigmatic field, and optical distortion of the optical image capturing system in the order from left to right of the fourth embodiment of the present application.
Figure 4C:
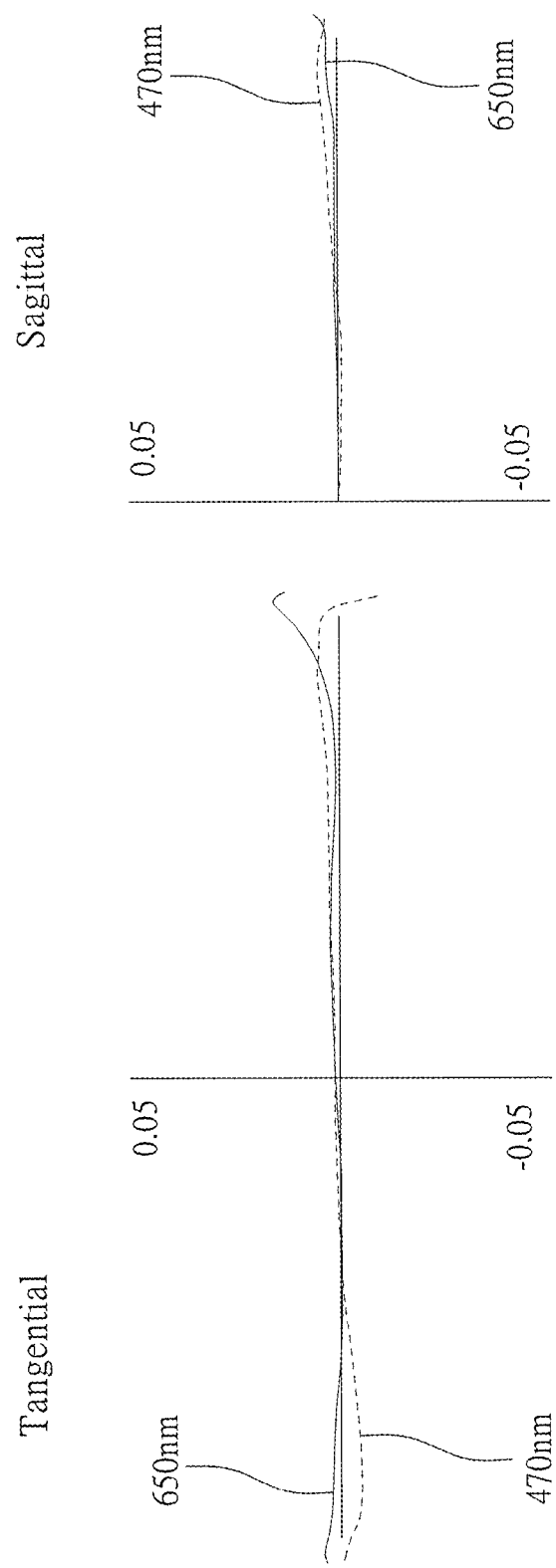
FIG. 4C shows a tangential fan and a sagittal fan of the optical image capturing system of the fourth embodiment of the present application, and a transverse aberration diagram at 0.7 field of view when a longest operation wavelength and a shortest operation wavelength pass through an edge of an aperture.

As shown in FIG. 4A and FIG. 4B, an optical image capturing system 40 of the fourth embodiment of the present invention includes, along an optical axis from an object side to an image side, a first lens 410, a second lens 420, a third lens 430, an aperture 400, a fourth lens 440, a fifth lens 450, a sixth lens 460, a seventh lens 470, an infrared rays filter 480, an image plane 490, and an image sensor 492. FIG. 4C is a transverse aberration diagram at 0.7 field of view of the fourth embodiment of the present application.

The first lens 410 has negative refractive power and is made of plastic. An object-side surface 412 thereof, which faces the object side, is a convex aspheric surface, and an image-side surface 414 thereof, which faces the image side, is a concave aspheric surface. The object-side surface 412 has an inflection point.

The second lens 420 has negative refractive power and is made of plastic. An object-side surface 422 thereof, which faces the object side, is a convex aspheric surface, and an image-side surface 424 thereof, which faces the image side, is a concave aspheric surface. The object-side surface 422 and the image-side surface 424 both have an inflection point.

The third lens 430 has positive refractive power and is made of plastic. An object-side surface 432 thereof, which faces the object side, is a convex aspheric surface, and an image-side surface 434 thereof, which faces the image side, is a concave aspheric surface.

The fourth lens 440 has positive refractive power and is made of plastic. An object-side surface 442, which faces the object side, is a convex aspheric surface, and an image-side surface 444, which faces the image side, is a convex aspheric surface.

The fifth lens 450 has negative refractive power and is made of plastic. An object-side surface 452, which faces the object side, is a convex aspheric surface, and an image-side surface 454, which faces the image side, is a concave aspheric surface. The object-side surface 452 and the image-side surface 454 both have an inflection point.

The sixth lens 460 has positive refractive power and is made of plastic. An object-side surface 462, which faces the object side, is a convex surface, and an image-side surface 464, which faces the image side, is a concave surface. The object-side surface 462 has an inflection point, and the image-side surface 464 has two inflection points. Whereby, incident angle of each field of view for the sixth lens can be effectively adjusted to improve aberration.

The seventh lens 470 has positive refractive power and is made of plastic. An object-side surface 472, which faces the object side, is a convex surface, and an image-side surface 474, which faces the image side, is a concave surface. It may help to shorten the back focal length to keep small in size. In addition, the object-side surface 472 and the image-side surface 474 both have an inflection point, which may reduce an incident angle of the light of an off-axis field of view and correct the aberration of the off-axis field of view.

The infrared rays filter 480 is made of glass and between the seventh lens 470 and the image plane 490. The infrared rays filter 480 gives no contribution to the focal length of the system.

The parameters of the lenses of the fourth embodiment are listed in Table 7 and Table 8.

TABLE 7 f = 3.8861 mm; f/HEP = 1.0; HAF = 32.4996 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | 1st lens | 73.68770294 | 1.593 | plastic | 1.565 | 58.00 | −11.553 |
| 2 | | 5.966711241 | 2.761 | | | | |
| 3 | 2nd lens | 10.67659157 | 0.416 | | 1.565 | 57.99 | −37.101 |
| 4 | | 6.981489945 | 1.066 | plastic | | | |
| 5 | 3rd lens | 14.14388485 | 24.241 | | 1.661 | 20.40 | 37.232 |
| 6 | | 10.33320715 | 1.163 | plastic | | | |
| 7 | Aperture | 1E+18 | −1.113 | | | | |
| 8 | 4th lens | 9.59719995 | 5.435 | plastic | 1.565 | 58.00 | 7.168 |
| 9 | | −5.601379117 | 0.050 | | | | |
| 10 | 5th lens | 11.68231418 | 2.635 | plastic | 1.514 | 56.80 | −20.843 |
| 11 | | 5.168138235 | 3.562 | | | | |
| 12 | 6th lens | 4.563074171 | 4.976 | plastic | 1.565 | 58.00 | 21.742 |
| 13 | | 4.38790537 | 0.885 | | | | |
| 14 | 7th lens | 3.52584168 | 1.030 | plastic | 1.565 | 58.00 | 12.357 |
| 15 | | 6.349618178 | 1.000 | | | | |
| 16 | Infrared rays filter | 1E+18 | 0.300 | BK_7 | 1.517 | 64.2 | |
| 17 | | 1E+18 | 0.005 | | | | |
| 18 | Image plane | 1E+18 | −0.005 | | | | |

Reference wavelength (d-line): 555 nm.

TABLE 8

Coefficients of the aspheric surfaces

| | Surface | | | | | | |
|---|---|---|---|---|---|---|---|
| | 1 | 2 | 3 | 4 | 5 | 6 | 8 |
| k | 2.692929E+01 | −4.904786E−01 | −2.100232E+00 | −2.791895E−01 | −2.495793E+00 | 2.188255E+00 | 4.143166E−01 |
| A4 | −6.527203E−05 | −5.107877E−04 | −6.453453E−05 | −2.790492E−05 | 1.501929E−04 | −2.282977E−04 | −3.501106E−05 |
| A6 | −8.847359E−07 | 8.669545E−07 | −2.896494E−07 | −5.930300E−06 | 1.329745E−06 | −1.473437E−05 | −6.175463E−06 |
| A8 | 2.183372E−08 | 1.448861E−07 | 1.034881E−07 | −3.355335E−07 | −1.810532E−07 | −3.914846E−08 | −2.672832E−07 |
| A10 | −1.712347E−10 | −1.088645E−09 | −3.023756E−09 | 1.810344E−09 | 2.153237E−09 | 9.672767E−10 | 6.044887E−09 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| | Surface | | | | | | |
|---|---|---|---|---|---|---|---|
| | 9 | 10 | 11 | 12 | 13 | 14 | 15 |
| k | −5.938319E+00 | 1.626530E+00 | −7.869428E+00 | −2.555714E−01 | −1.192873E+00 | −5.653435E+00 | −1.061810E+01 |
| A4 | −2.155511E−04 | 8.868171E−05 | −9.564321E−04 | −6.509558E−04 | 2.090873E−03 | 6.988227E−03 | −7.926224E−04 |
| A6 | 3.480828E−06 | −1.794863E−05 | 1.265197E−05 | 1.222273E−05 | 7.379816E−04 | −1.741434E−03 | −9.414969E−04 |
| A8 | −1.300815E−08 | 2.475547E−09 | −8.816919E−07 | −7.194922E−07 | −3.844490E−05 | 1.744752E−04 | −2.728742E−05 |
| A10 | −6.344419E−09 | −8.117028E−09 | 1.354039E−08 | −1.875519E−08 | 4.074203E−06 | −1.785205E−05 | 2.904129E−06 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

An equation of the aspheric surfaces of the fourth embodiment is the same as that of the first embodiment, and the definitions are the same as well.

The exact parameters of the fourth embodiment based on Table 7 and Table 8 are listed in the following table:

Fourth embodiment (Reference wavelength: 555 nm)

| |f/f1| | |f/f2| | |f/f3| | |f/f4| | |f/f5| | |f/f6| |
|---|---|---|---|---|---|
| 0.3364 | 0.1047 | 0.1044 | 0.5422 | 0.1864 | 0.1787 |

| |f/f7| | ΣPPR | ΣNPR | ΣPPR/ΣNPR | IN12/f | IN67/f |
|---|---|---|---|---|---|
| 0.3145 | 1.1616 | 0.6057 | 1.9179 | 0.7105 | 0.2277 |

-continued

| Fourth embodiment (Reference wavelength: 555 nm) | | | | | |
|---|---|---|---|---|---|
| \|f1/f2\| | \|f2/f3\| | (TP1 + IN12)/TP2 | | (TP7 + IN67)/TP6 | |
| 0.3114 | 0.9965 | 10.4676 | | 0.3849 | |
| HOS | InTL | HOS/HOI | InS/HOS | ODT % | TDT % |
| 50.0000 | 48.7000 | 20.0000 | 0.3752 | 1.0020 | 0.4817 |
| HVT11 | HVT12 | HVT21 | HVT22 | HVT31 | HVT32 |
| 7.2033 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 2.4835 | 2.0130 | 0.8052 | 0.0403 |
| PSTA | PLTA | NSTA | NLTA | SSTA | SLTA |
| −0.009 mm | 0.013 mm | −0.00032 mm | 0.003 mm | 0.003 mm | 0.005 mm |

The figures related to the profile curve lengths obtained based on Table 7 and Table 8 are listed in the following table:

| Fourth embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.943 | 1.943 | 0.00016 | 100.01% | 1.593 | 121.99% |
| 12 | 1.943 | 1.976 | 0.03307 | 101.70% | 1.593 | 124.06% |
| 21 | 1.943 | 1.953 | 0.01027 | 100.53% | 0.416 | 469.58% |
| 22 | 1.943 | 1.968 | 0.02542 | 101.31% | 0.416 | 473.23% |
| 31 | 1.943 | 1.949 | 0.00618 | 100.32% | 24.241 | 8.04% |
| 32 | 1.943 | 1.955 | 0.01155 | 100.59% | 24.241 | 8.06% |
| 41 | 1.943 | 1.957 | 0.01347 | 100.69% | 5.435 | 36.00% |
| 42 | 1.943 | 1.972 | 0.02939 | 101.51% | 5.435 | 36.29% |
| 51 | 1.943 | 1.952 | 0.00931 | 100.48% | 2.635 | 74.08% |
| 52 | 1.943 | 1.970 | 0.02649 | 101.36% | 2.635 | 74.73% |
| 61 | 1.943 | 2.002 | 0.05921 | 103.05% | 4.976 | 40.24% |
| 62 | 1.943 | 2.028 | 0.08466 | 104.36% | 4.976 | 40.75% |
| 71 | 1.943 | 2.005 | 0.06228 | 103.21% | 1.030 | 194.62% |
| 72 | 1.943 | 1.953 | 0.01042 | 100.54% | 1.030 | 189.58% |
| ARS | EHD | ARS value | ARS − EHD | (ARS/EHD)% | TP | ARS/TP (%) |
| 11 | 7.923 | 7.926 | 0.002 | 100.03% | 1.593 | 497.56% |
| 12 | 6.228 | 7.351 | 1.123 | 118.03% | 1.593 | 461.48% |
| 21 | 6.383 | 6.614 | 0.232 | 103.63% | 0.416 | 1590.09% |
| 22 | 6.401 | 6.934 | 0.533 | 108.32% | 0.416 | 1666.97% |
| 31 | 6.413 | 6.617 | 0.204 | 103.18% | 24.241 | 27.30% |
| 32 | 4.586 | 4.733 | 0.147 | 103.21% | 24.241 | 19.53% |
| 41 | 4.620 | 4.793 | 0.173 | 103.74% | 5.435 | 88.19% |
| 42 | 5.250 | 5.568 | 0.318 | 106.05% | 5.435 | 102.46% |
| 51 | 5.322 | 5.432 | 0.110 | 102.07% | 2.635 | 206.11% |
| 52 | 5.367 | 5.451 | 0.084 | 101.57% | 2.635 | 206.83% |
| 61 | 4.634 | 5.616 | 0.981 | 121.17% | 4.976 | 112.86% |
| 62 | 2.769 | 3.185 | 0.416 | 115.03% | 4.976 | 64.02% |
| 71 | 2.756 | 2.847 | 0.092 | 103.32% | 1.030 | 276.33% |
| 72 | 2.818 | 2.888 | 0.069 | 102.46% | 1.030 | 280.24% |

The results of the equations of the fourth embodiment based on Table 7 and Table 8 are listed in the following table:

| Values related to the inflection points of the fourth embodiment (Reference wavelength: 555 nm) | | | | | | |
|---|---|---|---|---|---|---|
| HIF111 | 4.0162 | HIF111/HOI | 1.6065 | SGI111 | 0.0924 | \|SGI111\|/(\|SGI111\| + TP1) | 0.0548 |
| HIF211 | 5.2668 | HIF211/HOI | 2.1067 | SGI211 | 1.1779 | \|SGI211\|/(\|SGI211\| + TP2) | 0.7390 |
| HIF221 | 4.7067 | HIF221/HOI | 1.8827 | SGI221 | 1.5941 | \|SGI221\|/(\|SGI221\| + TP2) | 0.7931 |
| HIF511 | 3.8794 | HIF511/HOI | 1.5518 | SGI511 | 0.6518 | \|SGI511\|/(\|SGI511\| + TP5) | 0.1983 |

-continued

| Values related to the inflection points of the fourth embodiment (Reference wavelength: 555 nm) | | | | | | | |
|---|---|---|---|---|---|---|---|
| HIF521 | 2.2659 | HIF521/HOI | 0.9063 | SGI521 | 0.3696 | \|SGI521\|/(\|SGI521\| + TP5) | 0.1230 |
| HIF711 | 1.7439 | HIF711/HOI | 0.6975 | SGI711 | 0.3762 | \|SGI711\|/(\|SGI711\| + TP7) | 0.2675 |
| HIF721 | 1.2794 | HIF721/HOI | 0.5118 | SGI721 | 0.1119 | \|SGI721\|/(\|SGI721\| + TP7) | 0.0979 |

[Fifth Embodiment]

Figure 5A:
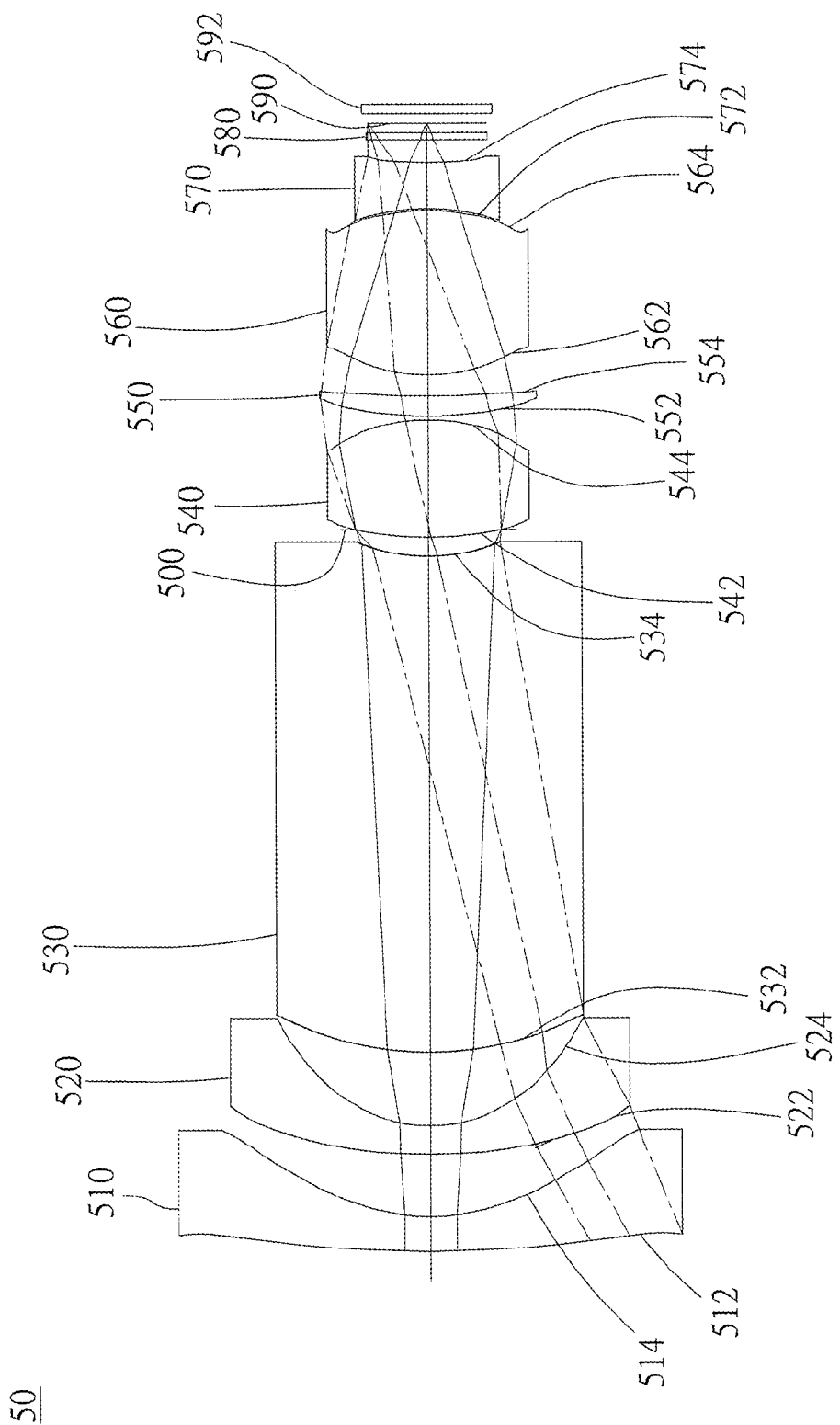
FIG. 5A is a schematic diagram of a fifth embodiment of the present invention.
Figure 5B:
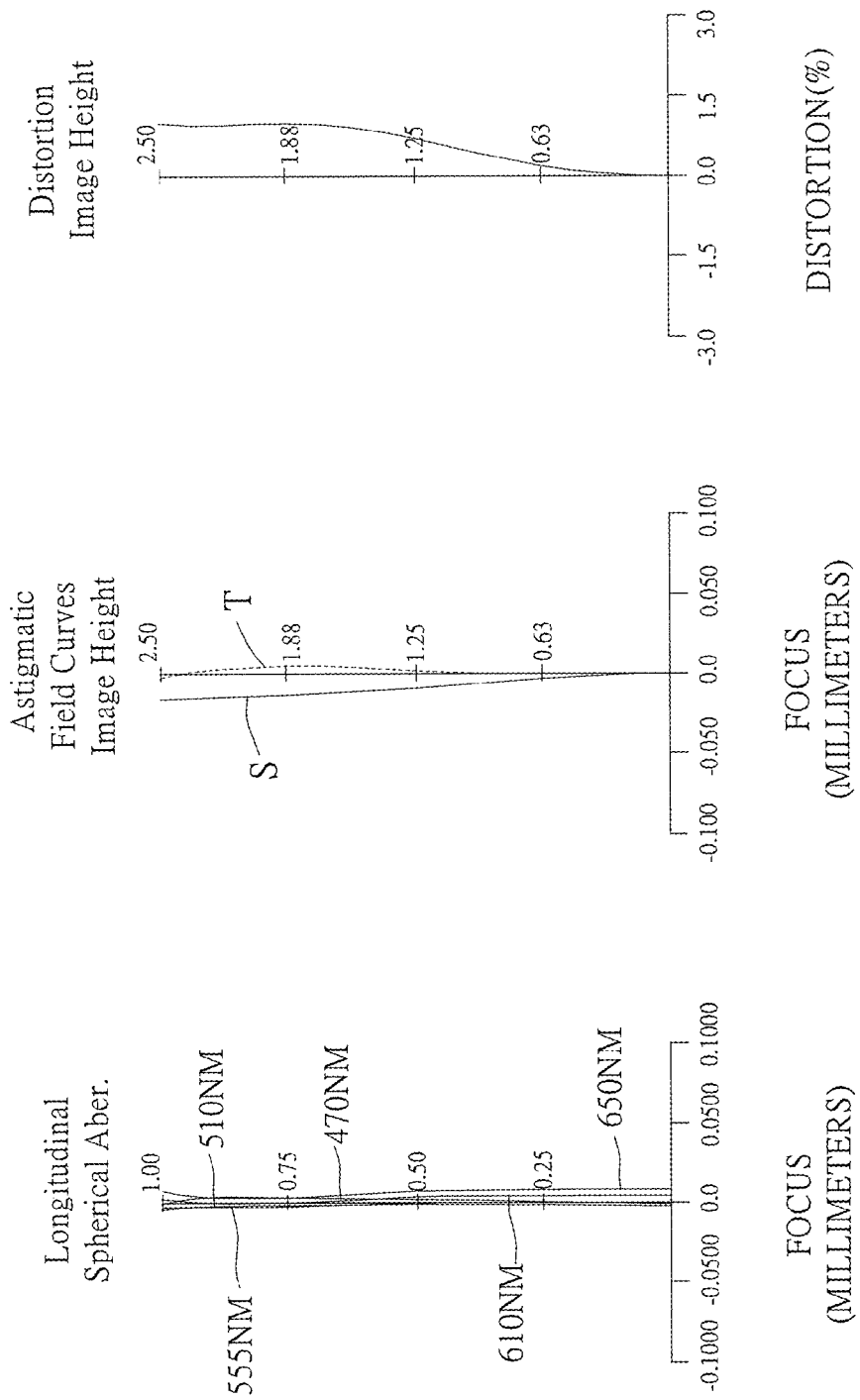
FIG. 5B shows curve diagrams of longitudinal spherical aberration, astigmatic field, and optical distortion of the optical image capturing system in the order from left to right of the fifth embodiment of the present application.
Figure 5:
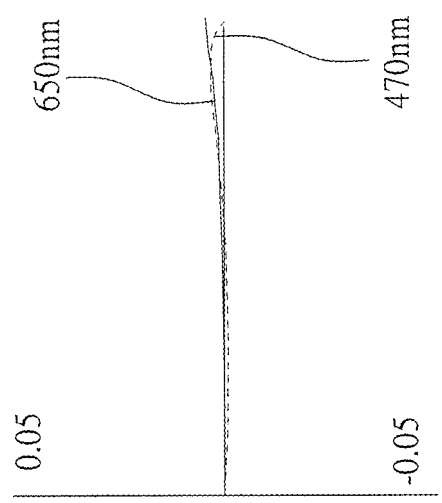
FIG. 5C shows a tangential fan and a sagittal fan of the optical image capturing system of the fifth embodiment of the present application, and a transverse aberration diagram at 0.7 field of view when a longest operation wavelength and a shortest operation wavelength pass through an edge of an aperture.
Figure 5:
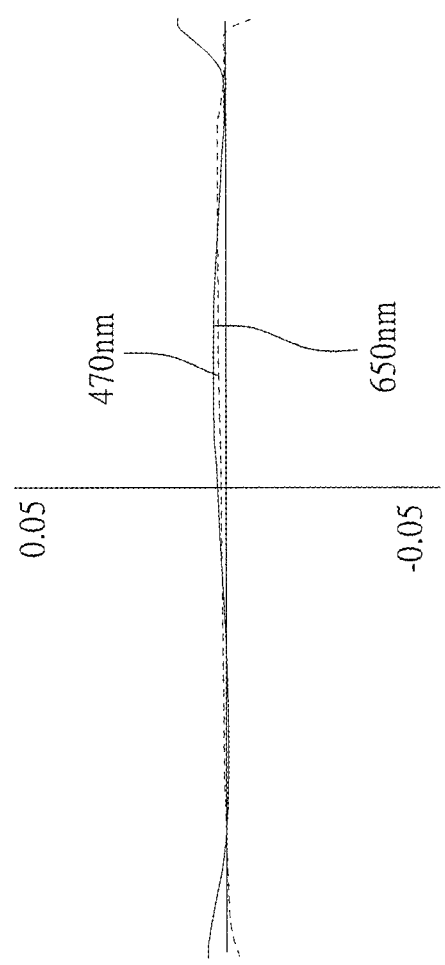

As shown in FIG. 5A and FIG. 5B, an optical image capturing system of the fifth embodiment of the present invention includes, along an optical axis from an object side to an image side, a first lens 510, a second lens 520, a third lens 530, an aperture 500, a fourth lens 540, a fifth lens 550, a sixth lens 560, a seventh lens 570, an infrared rays filter 580, an image plane 590, and an image sensor 592. FIG. 5C is a transverse aberration diagram at 0.7 field of view of the fifth embodiment of the present application.

The first lens 510 has negative refractive power and is made of plastic. An object-side surface 512, which faces the object side, is a concave aspheric surface, and an image-side surface 514, which faces the image side, is a convex aspheric surface. The object-side surface 512 and the image-side surface 514 both have an inflection point.

The second lens 520 has negative refractive power and is made of plastic. An object-side surface 522 thereof, which faces the object side, is a convex aspheric surface, and an image-side surface 524 thereof, which faces the image side, is a concave aspheric surface.

The third lens 530 has positive refractive power and is made of plastic. An object-side surface 532, which faces the object side, is a convex aspheric surface, and an image-side surface 534, which faces the image side, is a concave aspheric surface.

The fourth lens 540 has positive refractive power and is made of plastic. An object-side surface 542, which faces the object side, is a convex aspheric surface, and an image-side surface 544, which faces the image side, is a convex aspheric surface.

The fifth lens 550 has positive refractive power and is made of plastic. An object-side surface 552, which faces the object side, is a convex aspheric surface, and an image-side surface 554, which faces the image side, is a concave aspheric surface. The image-side surface 554 has two inflection points.

The sixth lens 560 can have positive refractive power and is made of plastic. An object-side surface 562, which faces the object side, is a convex surface, and an image-side surface 564, which faces the image side, is a convex surface. Whereby, incident angle of each field of view for the sixth lens 560 can be effectively adjusted to improve aberration.

The seventh lens 570 has negative refractive power and is made of plastic. An object-side surface 572, which faces the object side, is a concave surface, and an image-side surface 574, which faces the image side, is a concave surface. It may help to shorten the back focal length to keep small in size. In addition, it may help to shorten the back focal length to keep small in size. In addition, it could effectively suppress the incidence angle of light in the off-axis view field, and correct the off-axis view field aberration.

The infrared rays filter 580 is made of glass and between the seventh lens 570 and the image plane 590. The infrared rays filter 580 gives no contribution to the focal length of the system.

The parameters of the lenses of the fifth embodiment are listed in Table 9 and Table 10.

TABLE 9 f = 2.7016 mm; f/HEP = 1.2; HAF = 42.5004 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | 1st lens | 53.73408454 | 1.547 | plastic | 1.565 | 58.00 | −17.950 |
| 2 | | 8.464920032 | 2.744 | | | | |
| 3 | 2nd lens | 23.02512143 | 1.286 | plastic | 1.565 | 58.00 | −14.752 |
| 4 | | 6.009854895 | 3.252 | | | | |
| 5 | 3rd lens | 14.65459432 | 22.043 | plastic | 1.661 | 20.40 | 56.097 |
| 6 | | 9.59565139 | 1.158 | | | | |
| 7 | Aperture | 1E+18 | −0.334 | | | | |
| 8 | 4th lens | 14.89294224 | 5.210 | plastic | 1.565 | 58.00 | 9.775 |
| 9 | | −7.705173093 | 0.164 | | | | |
| 10 | 5th lens | 20.2234431 | 0.880 | plastic | 1.565 | 58.00 | 83.348 |
| 11 | | 34.80521751 | 0.926 | | | | |
| 12 | 6th lens | 6.636103697 | 7.307 | plastic | 1.565 | 58.00 | 7.603 |
| 13 | | −7.393705694 | 0.050 | | | | |
| 14 | 7th lens | −10.87069173 | 2.048 | plastic | 1.661 | 20.40 | −9.520 |
| 15 | | 16.40677615 | 1.000 | | | | |
| 16 | Infrared rays filter | 1E+18 | 0.300 | BK_7 | 1.517 | 64.2 | |
| 17 | | 1E+18 | 0.420 | | | | |
| 18 | Image plane | 1E+18 | −0.001 | | | | |

Reference wavelength (d-line): 555 nm; the position of blocking light: none.

TABLE 10

| | Coefficients of the aspheric surfaces | | | | | | |
|---|---|---|---|---|---|---|---|
| | Surface | | | | | | |
| | 1 | 2 | 3 | 4 | 5 | 6 | 8 |
| k | 3.618955E+00 | −3.031024E−01 | 7.931451E−01 | −2.693259E−01 | −1.425228E+00 | 2.770404E+00 | −2.217054E+00 |
| A4 | 2.411488E−05 | −2.768568E−04 | 1.946455E−05 | 4.262550E−05 | 3.412442E−05 | 5.446384E−04 | −1.334809E−04 |
| A6 | −2.122651E−07 | −1.311467E−06 | 5.468398E−07 | 2.720022E−06 | 2.402337E−06 | 2.594212E−05 | 1.048079E−05 |
| A8 | −2.623113E−09 | 4.363415E−08 | −4.705487E−09 | −1.707580E−08 | 4.901341E−08 | 2.621409E−06 | 1.070173E−06 |
| A10 | 3.299972E−12 | −5.902469E−10 | 1.243246E−10 | −5.125700E−09 | −1.267717E−09 | −4.992981E−08 | 2.190826E−08 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |
| | Surface | | | | | | |
| | 9 | 10 | 11 | 12 | 13 | 14 | 15 |
| k | 5.648879E−01 | 3.306063E+00 | 4.453534E+01 | −3.503850E−01 | −4.948034E+00 | 1.720790E+00 | −4.840480E+01 |
| A4 | −5.698380E−05 | 1.572129E−04 | −3.735323E−04 | −1.732954E−04 | 2.301144E−03 | −1.396957E−03 | −1.932055E−03 |
| A6 | 4.854988E−06 | 7.454665E−06 | −1.349042E−05 | −1.029698E−05 | −1.793859E−04 | −2.716891E−05 | 3.988312E−04 |
| A8 | 7.211801E−08 | 2.970327E−07 | −1.793019E−07 | −4.536958E−07 | −2.120883E−05 | 1.917450E−05 | 1.401473E−05 |
| A10 | −9.066195E−09 | 9.174876E−09 | 3.149129E−08 | −3.421250E−08 | 1.354472E−06 | −1.153436E−06 | 5.815514E−06 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

An equation of the aspheric surfaces of the fifth embodiment is the same as that of the first embodiment, and the definitions are the same as well.

The exact parameters of the fifth embodiment based on Table 9 and Table 10 are listed in the following table:

| Fifth embodiment (Reference wavelength: 555 nm) | | | | | |
|---|---|---|---|---|---|
| |f/f1| | |f/f2| | |f/f3| | |f/f4| | |f/f5| | |f/f6| |
| 0.1505 | 0.1831 | 0.0482 | 0.2764 | 0.0324 | 0.3553 |
| |f/f7| | ΣPPR | ΣNPR | ΣPPR/|ΣNPR| | IN12/f | IN67/f |
| 0.2838 | 0.8304 | 0.4993 | 1.6630 | 1.0157 | 0.0185 |
| |f1/f2| | |f2/f3| | (TP1 + IN12)/TP2 | | (TP7 + IN67)/TP6 | |
| 1.2168 | 0.2630 | 3.3382 | | 0.2872 | |
| HOS | InTL | HOS/HOI | InS/HOS | ODT % | TDT % |
| 50.0000 | 48.2811 | 20.0000 | 0.3594 | 1.0007 | 0.0977 |
| HVT11 | HVT12 | HVT21 | HVT22 | HVT31 | HVT32 |
| 9.9630 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 0.0000 | 0.0000 | 0.0000 | 0.0000 |
| PSTA | PLTA | NSTA | NLTA | SSTA | SLTA |
| −0.006 mm | 0.011 mm | −0.003 mm | 0.004 mm | 0.00008 mm | 0.004 mm |

The figures related to the profile curve lengths obtained based on Table 9 and Table 10 are listed in the following table:

| Fifth embodiment (Reference wavelength: 555 nm) | | | | | | |
|---|---|---|---|---|---|---|
| ARE | 1/2(HEP) | ARE value | ARE − 1/2(HEP) | 2(ARE/HEP)% | TP | ARE/TP (%) |
| 11 | 1.126 | 1.125 | −0.00058 | 99.95% | 1.547 | 72.71% |
| 12 | 1.126 | 1.128 | 0.00262 | 100.23% | 1.547 | 72.92% |
| 21 | 1.126 | 1.125 | −0.00021 | 99.98% | 1.286 | 87.55% |
| 22 | 1.126 | 1.132 | 0.00599 | 100.53% | 1.286 | 88.03% |
| 31 | 1.126 | 1.126 | 0.00045 | 100.04% | 22.043 | 5.11% |
| 32 | 1.126 | 1.128 | 0.00208 | 100.19% | 22.043 | 5.12% |
| 41 | 1.126 | 1.126 | 0.00039 | 100.03% | 5.210 | 21.61% |
| 42 | 1.126 | 1.129 | 0.00341 | 100.30% | 5.210 | 21.67% |
| 51 | 1.126 | 1.126 | −0.00006 | 99.99% | 0.880 | 127.94% |
| 52 | 1.126 | 1.125 | −0.00048 | 99.96% | 0.880 | 127.89% |
| 61 | 1.126 | 1.130 | 0.00472 | 100.42% | 7.307 | 15.47% |
| 62 | 1.126 | 1.129 | 0.00307 | 100.27% | 7.307 | 15.45% |
| 71 | 1.126 | 1.127 | 0.00157 | 100.14% | 2.048 | 55.03% |
| 72 | 1.126 | 1.126 | 0.00001 | 100.00% | 2.048 | 54.95% |
| ARS | EHD | ARS value | ARS − EHD | (ARS/EHD)% | TP | ARS/TP (%) |
| 11 | 10.843 | 10.884 | 0.041 | 100.37% | 1.547 | 703.41% |
| 12 | 9.003 | 9.950 | 0.946 | 110.51% | 1.547 | 643.01% |
| 21 | 8.600 | 9.020 | 0.420 | 104.88% | 1.286 | 701.68% |
| 22 | 6.573 | 8.558 | 1.985 | 130.20% | 1.286 | 665.71% |
| 31 | 6.588 | 6.883 | 0.294 | 104.47% | 22.043 | 31.22% |
| 32 | 3.085 | 3.183 | 0.098 | 103.17% | 22.043 | 14.44% |
| 41 | 3.132 | 3.156 | 0.024 | 100.76% | 5.210 | 60.58% |
| 42 | 4.312 | 4.619 | 0.307 | 107.11% | 5.210 | 88.65% |
| 51 | 4.593 | 4.706 | 0.113 | 102.45% | 0.880 | 534.88% |
| 52 | 4.552 | 4.558 | 0.006 | 100.14% | 0.880 | 518.07% |
| 61 | 4.329 | 4.551 | 0.222 | 105.13% | 7.307 | 62.29% |
| 62 | 3.313 | 3.410 | 0.097 | 102.94% | 7.307 | 46.67% |
| 71 | 3.111 | 3.180 | 0.069 | 102.22% | 2.048 | 155.25% |
| 72 | 2.514 | 2.542 | 0.028 | 101.11% | 2.048 | 124.07% |

The results of the equations of the fifth embodiment based on Table 9 and Table 10 are listed in the following table:

| Values related to the inflection points of the fifth embodiment (Reference wavelength: 555 nm) | | | | | | |
|---|---|---|---|---|---|---|
| HIF111 | 7.2394 | HIF111/HOI | 2.8958 | SGI111 | 0.5155 | \|SGI111\|/(\|SGI111\| + TP1) | 0.2499 |
| HIF121 | 7.3487 | HIF121/HOI | 2.9395 | SGI121 | 2.8631 | \|SGI121\|/(\|SGI121\| + TP1) | 0.6492 |
| HIF521 | 2.5411 | HIF521/HOI | 1.0165 | SGI521 | 0.0800 | \|SGI521\|/(\|SGI521\| + TP5) | 0.0834 |
| HIF522 | 3.4642 | HIF522/HOI | 1.3857 | SGI522 | 0.1251 | \|SGI522\|/(\|SGI522\| + TP5) | 0.1245 |
| HIF611 | 3.5548 | HIF611/HOI | 1.4219 | SGI611 | 0.9301 | \|SGI611\|/(\|SGI611\| + TP6) | 0.1129 |

[Sixth Embodiment]

Figure 6A:
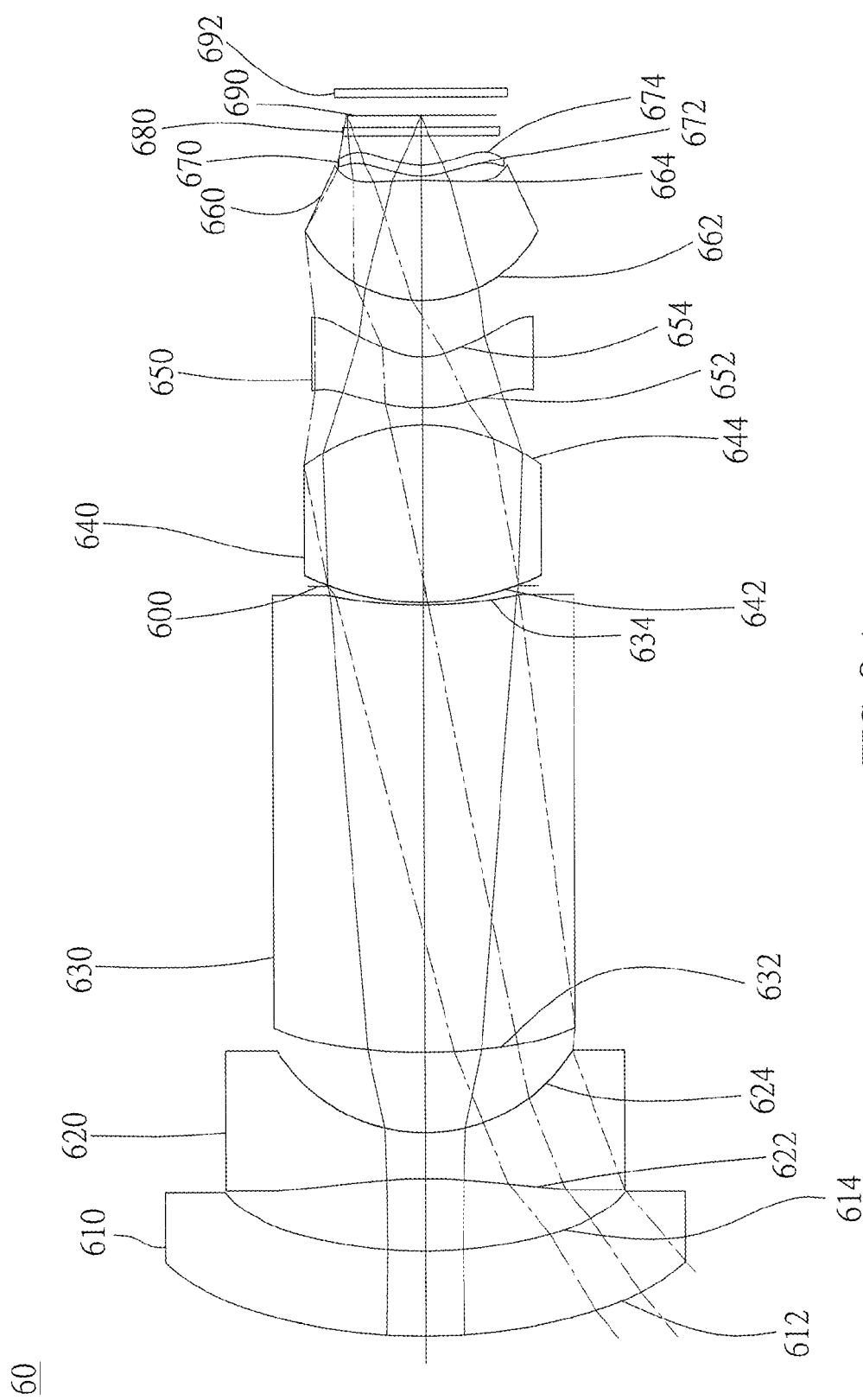
FIG. 6A is a schematic diagram of a sixth embodiment of the present invention.
Figure 6:
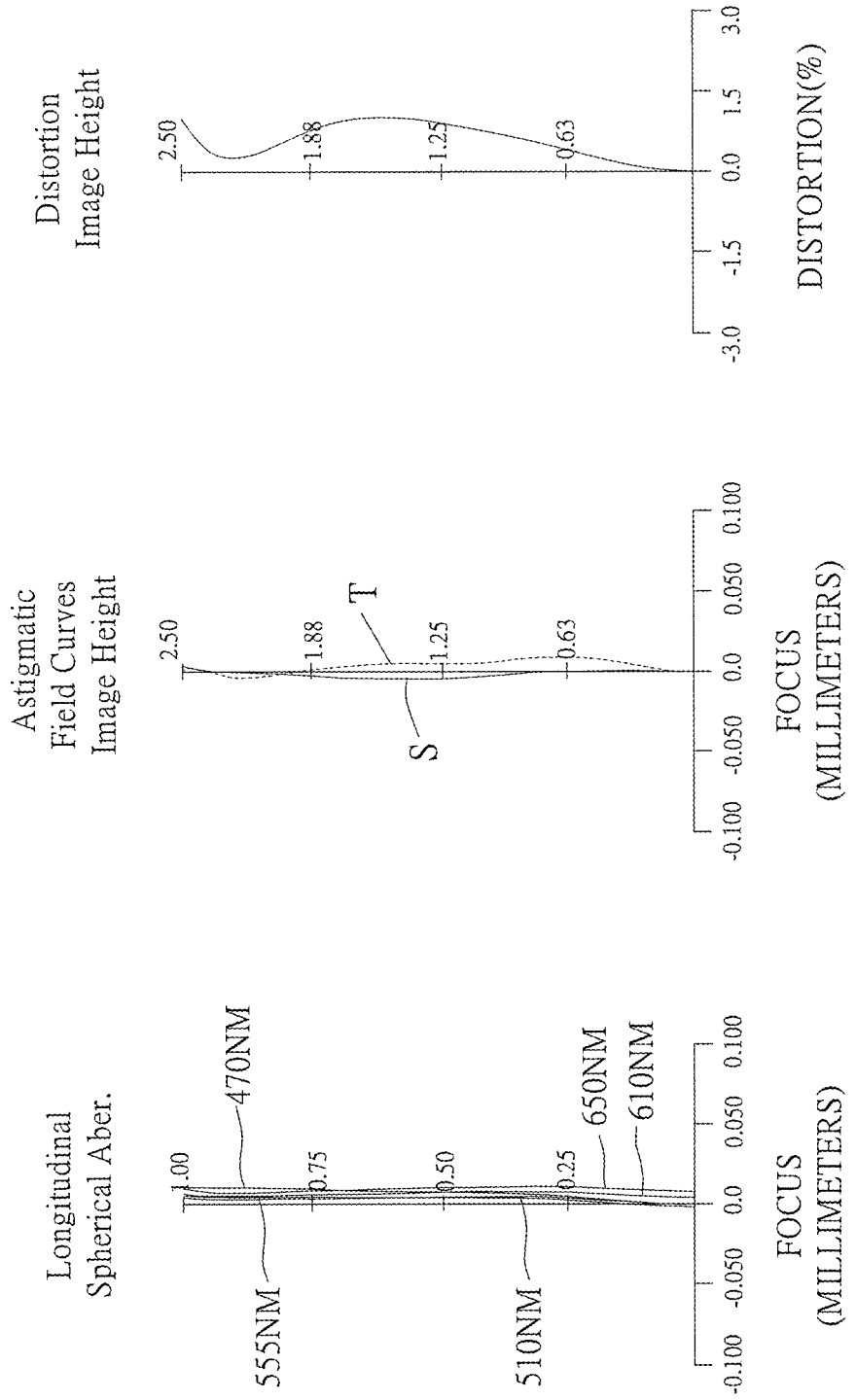
FIG. 6B shows curve diagrams of longitudinal spherical aberration, astigmatic field, and optical distortion of the optical image capturing system in the order from left to right of the sixth embodiment of the present application.
FIG. 6C shows a tangential fan and a sagittal fan of the optical image capturing system of the sixth embodiment of the present application, and a transverse aberration diagram at 0.7 field of view when a longest operation wavelength and a shortest operation wavelength pass through an edge of an aperture.
Figure 6:
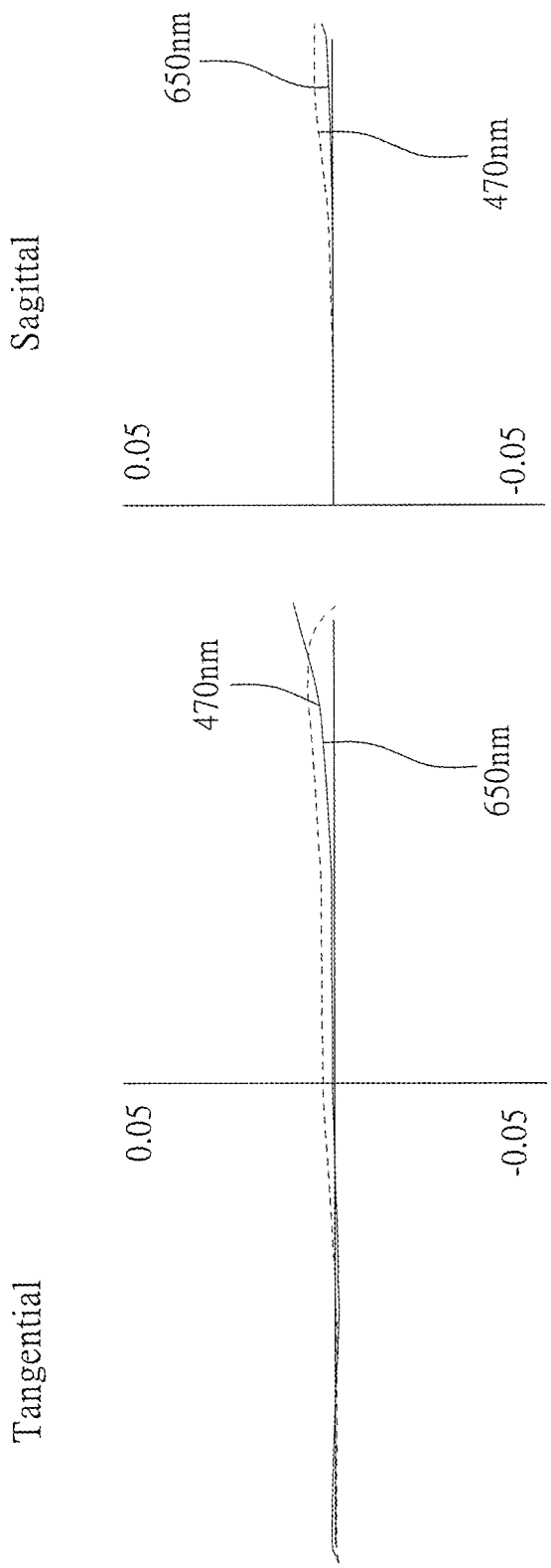

As shown in FIG. 6A and FIG. 6B, an optical image capturing system of the sixth embodiment of the present invention includes, along an optical axis from an object side to an image side, a first lens 610, a second lens 620, a third lens 630, an aperture 600, a fourth lens 640, a fifth lens 650, a seventh lens 660, a seventh lens 670, an infrared rays filter 680, an image plane 690, and an image sensor 692. FIG. 6C is a transverse aberration diagram at 0.7 field of view of the sixth embodiment of the present application.

The first lens 610 has negative refractive power and is made of plastic. An object-side surface 612, which faces the object side, is a convex aspheric surface, and an image-side surface 614, which faces the image side, is a concave aspheric surface.

The second lens 620 has negative refractive power and is made of plastic. An object-side surface 622 thereof, which faces the object side, is a concave aspheric surface, and an image-side surface 624 thereof, which faces the image side, is a concave aspheric surface. The object-side surface 622 has two inflection points.

The third lens 630 has positive refractive power and is made of plastic. An object-side surface 632, which faces the object side, is a convex aspheric surface, and an image-side surface 634, which faces the image side, is a concave aspheric surface.

The fourth lens 640 has positive refractive power and is made of plastic. An object-side surface 642, which faces the object side, is a convex aspheric surface, and an image-side surface 644, which faces the image side, is a convex aspheric surface.

The fifth lens 650 has negative refractive power and is made of plastic. An object-side surface 652, which faces the object side, is a convex aspheric surface, and an image-side surface 654, which faces the image side, is a concave aspheric surface. The object-side surface 652 and the image-side surface both have an inflection point.

The sixth lens 660 can have positive refractive power and is made of plastic. An object-side surface 662, which faces the object side, is a convex surface, and an image-side surface 664, which faces the image side, is a convex surface. The image-side surface 664 has an inflection point. Whereby, incident angle of each field of view for the sixth lens 660 can be effectively adjusted to improve aberration.

The seventh lens 670 has negative refractive power and is made of plastic. An object-side surface 672, which faces the object side, is a convex surface, and an image-side surface 674, which faces the image side, is a concave surface. The object-side surface 672 and the image-side surface 674 both have two inflection points. It may help to shorten the back focal length to keep small in size. In addition, it may reduce an incident angle of the light of an off-axis field of view and correct the aberration of the off-axis field of view.

The infrared rays filter 680 is made of glass and between the seventh lens 670 and the image plane 690. The infrared rays filter 680 gives no contribution to the focal length of the system.

The parameters of the lenses of the sixth embodiment are listed in Table 11 and Table 12.

TABLE 11 f = 3.2255 mm; f/HEP = 1.2; HAF = 37.5000 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | 1$^{st}$ lens | 21.58880613 | 2.952 | plastic | 1.650 | 21.40 | −94.609 |
| 2 | | 15.14660988 | 2.502 | | | | |
| 3 | 2$^{nd}$ lens | −17.11787985 | 1.612 | plastic | 1.565 | 58.00 | −7.304 |
| 4 | | 5.645899166 | 2.806 | | | | |
| 5 | 3$^{rd}$ lens | 16.69069701 | 15.648 | plastic | 1.661 | 20.40 | 49.708 |
| 6 | | 21.01131228 | 0.641 | | | | |
| 7 | Aperture | 1E+18 | −0.591 | | | | |
| 8 | 4$^{th}$ lens | 8.404304679 | 6.204 | plastic | 1.565 | 58.00 | 6.560 |
| 9 | | −4.888053033 | 0.613 | | | | |
| 10 | 5$^{th}$ lens | 5.460121639 | 1.769 | plastic | 1.650 | 21.40 | −8.987 |
| 11 | | 2.470128306 | 1.943 | | | | |
| 12 | 6$^{th}$ lens | 4.30623506 | 4.191 | plastic | 1.565 | 58.00 | 6.417 |
| 13 | | −15.16595146 | 0.155 | | | | |
| 14 | 7$^{th}$ lens | 2.880757944 | 0.378 | plastic | 1.514 | 56.80 | −83.462 |
| 15 | | 2.57958575 | 1.000 | | | | |
| 16 | Infrared rays filter | 1E+18 | 0.300 | BK_7 | 1.517 | 64.2 | |
| 17 | | 1E+18 | 0.425 | | | | |
| 18 | Image plane | 1E+18 | 0.003 | | | | |

Reference wavelength (d-line): 555 nm; the position of blocking light; none.

TABLE 12

Coefficients of the aspheric surfaces

| | Surface | | | | | | |
|---|---|---|---|---|---|---|---|
| | 1 | 2 | 3 | 4 | 5 | 6 | 8 |
| k | 2.776147E+00 | 1.599258E+00 | −2.982399E+01 | −2.244430E−01 | −1.753687E+01 | 2.663775E+01 | 1.794173E−01 |
| A4 | 1.688104E−05 | −1.418257E−04 | 2.001343E−04 | 1.815472E−04 | 8.460320E−05 | −5.026247E−05 | −2.383244E−05 |
| A6 | 2.685880E−07 | 1.235113E−06 | 1.441778E−06 | 1.198923E−05 | 6.199292E−06 | 9.789832E−06 | 3.782462E−06 |
| A8 | −1.679031E−09 | 2.031855E−08 | 2.734199E−09 | 3.946013E−07 | 1.825169E−07 | 6.379291E−07 | −5.444996E−07 |
| A10 | 6.312778E−11 | 1.578490E−09 | −8.158221E−10 | −3.051636E−08 | 4.047960E−10 | −9.661097E−08 | −3.048912E−08 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| | Surface | | | | | | |
|---|---|---|---|---|---|---|---|
| | 9 | 10 | 11 | 12 | 13 | 14 | 15 |
| k | −4.256436E+00 | −5.841253E+00 | −2.519374E+00 | −4.118244E−02 | 2.573948E+01 | −4.682504E+00 | −1.628285E+00 |
| A4 | −3.925841E−04 | 2.775979E−04 | −6.338307E−04 | −7.128102E−04 | 3.592396E−03 | −5.156569E−05 | −1.385546E−02 |
| A6 | −4.322887E−05 | −1.378717E−04 | −2.570564E−05 | 5.104818E−05 | 1.408510E−03 | −1.831122E−03 | −6.329142E−04 |
| A18 | 1.395285E−06 | 1.709216E−06 | −1.341494E−05 | 2.660298E−07 | −2.338729E−04 | −3.307368E−06 | −1.461514E−04 |
| A10 | −3.412319E−08 | −1.144929E−07 | 5.416232E−07 | −4.899592E−08 | 2.545661E−05 | 1.137340E−05 | 2.136023E−05 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

An equation of the aspheric surfaces of the sixth embodiment is the same as that of the first embodiment, and the definitions are the same as well.

The exact parameters of the sixth embodiment based on Table 11 and Table 12 are listed in the following table:

| Sixth embodiment (Reference wavelength: 555 nm) | | | | | |
|---|---|---|---|---|---|
| \|f/f1\| | \|f/f2\| | \|f/f3\| | \|f/f4\| | \|f/f5\| | \|f/f6\| |
| 0.0341 | 0.4416 | 0.0649 | 0.4917 | 0.3589 | 0.5026 |
| \|f/f7\| | ΣPPR | ΣNPR | ΣPPR/\|ΣNPR\| | IN12/f | IN67/f |
| 0.0386 | 1.4522 | 0.4803 | 3.0237 | 0.7756 | 0.0479 |
| \|f1/f2\| | \|f2/f3\| | (TP1 + IN12)/TP2 | | (TP7 + IN67)/TP6 | |
| 12.9537 | 0.1469 | 3.3832 | | 0.1270 | |
| HOS | InTL | HOS/HOI | InS/HOS | ODT % | TDT % |
| 42.5503 | 40.8218 | 17.0201 | 0.3852 | 1.0262 | 0.7588 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 1.6663 | 2.1894 | 2.0698 | 0.8279 | 0.0486 |
| PSTA | PLTA | NSTA | NLTA | SSTA | SLTA |
| −0.00014 mm | 0.010 mm | −0.00038 mm | −0.030045 mm | 0.004 mm | 0.003 mm |

The figures related to the profile curve lengths obtained based on Table 11 and Table 12 are listed in the following table:

| Sixth embodiment (Reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.344 | 1.344 | −0.00008 | 99.99% | 2.952 | 45.52% |
| 12 | 1.344 | 1.345 | 0.00079 | 100.06% | 2.952 | 45.55% |
| 21 | 1.344 | 1.344 | 0.00025 | 100.02% | 1.612 | 83.38% |
| 22 | 1.344 | 1.356 | 0.01206 | 100.90% | 1.612 | 84.11% |
| 31 | 1.344 | 1.344 | 0.00042 | 100.03% | 15.648 | 8.59% |
| 32 | 1.344 | 1.344 | 0.00002 | 100.00% | 15.648 | 8.59% |
| 41 | 1.344 | 1.349 | 0.00483 | 100.36% | 6.204 | 21.74% |
| 42 | 1.344 | 1.358 | 0.01398 | 101.04% | 6.204 | 21.89% |
| 51 | 1.344 | 1.354 | 0.01054 | 100.78% | 1.769 | 76.58% |
| 52 | 1.344 | 1.393 | 0.04921 | 103.66% | 1.769 | 78.77% |
| 61 | 1.344 | 1.365 | 0.02127 | 101.58% | 4.191 | 32.58% |
| 62 | 1.344 | 1.344 | −0.00006 | 100.00% | 4.191 | 32.07% |
| 71 | 1.344 | 1.373 | 0.02890 | 102.15% | 0.378 | 363.47% |
| 72 | 1.344 | 1.380 | 0.03585 | 102.67% | 0.378 | 365.31% |
| ARS | EHD | ARS value | ARS − EHD | (ARS/EHD)% | TP | ARS/TP (%) |
| 11 | 8.833 | 9.408 | 0.576 | 106.52% | 2.952 | 318.66% |
| 12 | 6.806 | 7.294 | 0.488 | 107.18% | 2.952 | 247.06% |
| 21 | 6.773 | 6.789 | 0.016 | 100.23% | 1.612 | 421.12% |
| 22 | 5.000 | 6.019 | 1.019 | 120.38% | 1.612 | 373.38% |
| 31 | 5.103 | 5.210 | 0.107 | 102.09% | 15.648 | 33.30% |
| 32 | 3.231 | 3.253 | 0.022 | 100.69% | 15.648 | 20.79% |
| 41 | 3.263 | 3.348 | 0.086 | 102.63% | 6.204 | 53.98% |
| 42 | 4.014 | 4.317 | 0.302 | 107.53% | 6.204 | 69.58% |
| 51 | 3.685 | 3.751 | 0.066 | 101.79% | 1.769 | 212.05% |
| 52 | 3.642 | 3.930 | 0.288 | 107.91% | 1.769 | 222.21% |
| 61 | 3.937 | 4.910 | 0.973 | 124.71% | 4.191 | 117.17% |
| 62 | 2.829 | 2.981 | 0.151 | 105.35% | 4.191 | 71.13% |
| 71 | 2.821 | 2.884 | 0.063 | 102.24% | 0.378 | 763.61% |
| 72 | 2.816 | 2.905 | 0.090 | 103.19% | 0.378 | 769.22% |

The results of the equations of the sixth embodiment based on Table 11 and Table 12 are listed in the following table:

| Values related to the inflection points of the sixth embodiment (Reference wavelength: 555 nm) | | | | | | |
|---|---|---|---|---|---|---|
| HIF211 | 2.9237 | HIF211/HOI | 1.1695 | SGI211 | −0.1964 | \|SGI211\|/(\|SGI211\| + TP2) | 0.1086 |
| HIF212 | 6.1922 | HIF212/HOI | 2.4769 | SGI212 | −0.3896 | \|SGI212\|/(\|SGI212\| + TP2) | 0.1946 |
| HIF511 | 2.2058 | HIF511/HOI | 0.8823 | SGI511 | 0.3725 | \|SGI511\|/(\|SGI511\| + TP5) | 0.1740 |
| HIF521 | 2.2347 | HIF521/HOI | 0.8939 | SGI521 | 0.7837 | \|SGI521\|/(\|SGI521\| + TP5) | 0.3070 |
| HIF621 | 1.0287 | HIF621/HOI | 0.4115 | SGI621 | −0.0306 | \|SGI621\|/(\|SGI621\| + TP6) | 0.0072 |
| HIF711 | 1.2992 | HIF711/HOI | 0.5197 | SGI711 | 0.2435 | \|SGI711\|/(\|SGI711\| + TP7) | 0.3919 |
| HIF712 | 2.7156 | HIF712/HOI | 1.0862 | SGI712 | 0.3358 | \|SGI712\|/(\|SGI712\| + TP7) | 0.4706 |
| HIF721 | 1.2355 | HIF721/HOI | 0.4942 | SGI721 | 0.2508 | \|SGI721\|/(\|SGI721\| + TP7) | 0.3990 |
| HIF722 | 2.6650 | HIF722/HOI | 1.0660 | SGI722 | 0.2895 | \|SGI722\|/(\|SGI722\| + TP7) | 0.4339 |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
   a first lens having negative refractive power;
   a second lens having refractive power;
   a third lens having refractive power;
   a fourth lens having refractive power;
   a fifth lens having refractive power;
   a sixth lens having refractive power;
   a seventh lens having refractive power; and
   an image plane;
   wherein the optical image capturing system consists of the seven lenses with refractive power; at least one lens among the first lens to the third lens has positive refractive power; at least one lens among the fourth lens to the seventh lens has positive refractive power; each lens among the first lens to the seventh lens has an object-side surface, which faces the object side, and an image-side surface, which faces the image side;
   wherein the optical image capturing system satisfies:

$1.0 \leq f/HEP \leq 10.0$;

$0 \deg < HAF \leq 150 \deg$; and $0.9 \leq 2(ARE/HEP) \leq 2.0$;

where f1, f2, f3, f4, f5, f6, and f7 are focal lengths of the first lens to the seventh lens, respectively; f is a focal length of the optical image capturing system; HEP is an entrance pupil diameter of the optical image capturing system; HOS is a distance in parallel with the optical axis from the object-side surface of the first lens to the image plane; InTL is a distance from the object-side surface of the first lens to the image-side surface of the seventh lens on the optical axis; for any surface of any lens; HAF is a half of a maximum field angle of the optical image capturing system; ARE is a profile curve length measured from a start point where the optical axis passes therethrough, along a surface profile thereof, and finally to a coordinate point of a perpendicular distance where is a half of the entrance pupil diameter away from the optical axis.

2. The optical image capturing system of claim 1, wherein the optical image capturing system further satisfies:

$PLTA \leq 200 \mu m$;

$PSTA \leq 200 \mu m$;

$NLTA \leq 200 \mu m$;

$NSTA \leq 200 \mu m$;

$SLTA \leq 200 \mu m$;

$SSTA \leq 200 \mu m$; and $|TDT| < 250\%$;

where TDT is a TV distortion; HOI is a maximum height for image formation on the image plane perpendicular to the optical axis; PLTA is a transverse aberration at 0.7 HOI on the image plane in the positive direction of a tangential fan of the optical image capturing system after a longest operation wavelength passing through an edge of the aperture for visible light; PSTA is a transverse aberration at 0.7 HOI on the image plane in the positive direction of the tangential fan after a shortest operation wavelength passing through the edge of the aperture for visible light; NLTA is a transverse aberration at 0.7 HOI on the image plane in the negative direction of the tangential fan after the longest operation wavelength passing through the edge of the aperture for visible light; NSTA is a transverse aberration at 0.7 HOI on the image plane in the negative direction of the tangential fan after the shortest operation wavelength passing through the edge of the aperture for visible light; SLTA is a transverse aberration at 0.7 HOI on the image plane of a sagittal fan of the optical image capturing system after the longest operation wavelength passing through the edge of the aperture for visible light; SSTA is a transverse aberration at 0.7 HOI on the image plane of a sagittal fan after the shortest operation wavelength passing through the edge of the aperture for visible light.

3. The optical image capturing system of claim 1, wherein the optical image capturing system further satisfies:

$0.9 \leq ARS/EHD \leq 2.0$;

where, for any surface of any lens, EHD is a maximum effective half diameter thereof, ARS is a profile curve length measured from a start point where the optical axis passes therethrough, along a surface profile thereof, and finally to an end point of the maximum effective half diameter thereof.

4. The optical image capturing system of claim 1, wherein the optical image capturing system further satisfies:

0 mm<HOS≤50 mm.

5. The optical image capturing system of claim 1, wherein the optical image capturing system further satisfies:

0 deg<HAF≤70 deg.

6. The optical image capturing system of claim 1, wherein the optical image capturing system further satisfies:

0.05≤ARE71/TP7≤25; and 0.05≤ARE72/TP7≤25;

where ARE71 is a profile curve length measured from a start point where the optical axis passes the object-side surface of the seventh lens, along a surface profile of the object-side surface of the seventh lens, and finally to a coordinate point of a perpendicular distance where is a half of the entrance pupil diameter away from the optical axis; ARE72 is a profile curve length measured from a start point where the optical axis passes the image-side surface of the seventh lens, along a surface profile of the image-side surface of the seventh lens, and finally to a coordinate point of a perpendicular distance where is a half of the entrance pupil diameter away from the optical axis; TP7 is a thickness of the seventh lens on the optical axis.

7. The optical image capturing system of claim 1, wherein the optical image capturing system further satisfies:

0.05≤ARE61/TP6≤25; and 0.05≤ARE62/TP6≤25;

where ARE61 is a profile curve length measured from a start point where the optical axis passes the object-side surface of the sixth lens, along a surface profile of the object-side surface of the sixth lens, and finally to a coordinate point of a perpendicular distance where is a half of the entrance pupil diameter away from the optical axis; ARE62 is a profile curve length measured from a start point where the optical axis passes the image-side surface of the sixth lens, along a surface profile of the image-side surface of the sixth lens, and finally to a coordinate point of a perpendicular distance where is a half of the entrance pupil diameter away from the optical axis; TP6 is a thickness of the sixth lens on the optical axis.

8. The optical image capturing system of claim 1, further comprising an aperture, wherein the optical image capturing system further satisfies:

0.2≤InS/HOS≤1.1;

where InS is a distance between the aperture and the image plane on the optical axis.

9. An optical image capturing system, in order along an optical axis from an object side to an image side, comprising:
    a first lens having refractive power;
    a second lens having refractive power;
    a third lens having refractive power;
    a fourth lens having refractive power;
    a fifth lens having refractive power;
    a sixth lens having refractive power;
    a seventh lens having refractive power; and
    an image plane;
    wherein the optical image capturing system consists of the seven lenses with refractive power; at least one surface of each of at least one lens among the first lens to the seventh lens has at least an inflection point thereon; at least one lens among the first lens to the third lens has positive refractive power; at least one lens among the fourth lens to the seventh lens has positive refractive power; each lens among the first lens to the seventh lens has an object-side surface, which faces the object side, and an image-side surface, which faces the image side; wherein the optical image capturing system satisfies:

1.0≤f/HEP≤10.0;

0 deg<HAF≤150 deg; and 0.9≤2(ARE/HEP)≤2.0;

where f1, f2, f3, f4, f5, f6, and f7 are focal lengths of the first lens to the seventh lens, respectively; f is a focal length of the optical image capturing system; HEP is an entrance pupil diameter of the optical image capturing system; HOS is a distance in parallel with the optical axis between the object-side surface of the first lens and the image plane; InTL is a distance from the object-side surface of the first lens to the image-side surface of the seventh lens on the optical axis; for any surface of any lens, HAF is a half of a maximum field angle of the optical image capturing system; ARE is a profile curve length measured from a start point where the optical axis passes therethrough, along a surface profile thereof, and finally to a coordinate point of a perpendicular distance where is a half of the entrance pupil diameter away from the optical axis.

10. The optical image capturing system of claim 9, wherein the optical image capturing system further satisfies:

0.9≤ARS/EHD≤2.0;

where, for any surface of any lens, EHD is a maximum effective half diameter thereof, ARS is a profile curve length measured from a start point where the optical axis passes therethrough, along a surface profile thereof, and finally to an end point of the maximum effective half diameter thereof.

11. The optical image capturing system of claim 9, wherein at least one surface of at least two lenses among the first lens to the seventh lens has at least an inflection point thereon.

12. The optical image capturing system of claim 9, wherein the optical image capturing system further satisfies:

PLTA≤200 μm;

PSTA≤200 μm;

NLTA≤200 μm;

NSTA≤200 μm;

SLTA≤200 μm;

SSTA≤200 μm; and

HOI>3.0 mm;

where TDT is a TV distortion; HOI is a maximum height for image formation on the image plane perpendicular to the optical axis; PLTA is a transverse aberration at 0.7 HOI on the image plane in the positive direction of a tangential fan of the optical image capturing system after a longest operation wavelength passing through an edge of the aperture for visible light; PSTA is a transverse aberration at 0.7 HOI on the image plane in the positive direction of the tangential fan after a shortest operation wavelength passing through the edge of the aperture for visible light; NLTA is a transverse aberration at 0.7 HOI on the image plane in the negative direction of the tangential fan after the longest operation wavelength passing through the edge of the aperture for visible light; NSTA is a transverse aberration at 0.7 HOI on the image plane in the negative direction of the tangential fan after the shortest operation wavelength passing through the edge of the aperture for visible light; SLTA is a transverse aberration at 0.7 HOI on the image plane of a sagittal fan of the optical image capturing system after the longest operation wavelength passing through the edge of the aperture for visible light; SSTA is a transverse aberration at 0.7 HOI on the image plane of a sagittal fan after the shortest operation wavelength passing through the edge of the aperture for visible light.

13. The optical image capturing system of claim 9, wherein the image plane is either flat or curved.

14. The optical image capturing system of claim 9, wherein the optical image capturing system further satisfies:

$0<IN12/f\leq3.0$;

where IN12 is a distance on the optical axis between the first lens and the second lens.

15. The optical image capturing system of claim 9, wherein the optical image capturing system further satisfies:

$0<IN67/f\leq3.0$;

where IN67 is a distance on the optical axis between the sixth lens and the seventh lens.

16. The optical image capturing system of claim 9, wherein the optical image capturing system further satisfies:

$0.1\leq(TP7+IN67)/TP6\leq10$;

where IN67 is a distance on the optical axis between the sixth lens and the seventh lens; TP6 is a thickness of the sixth lens on the optical axis; TP7 is a thickness of the seventh lens on the optical axis.

17. The optical image capturing system of claim 9, wherein the optical image capturing system further satisfies:

$0.1\leq(TP1+IN12)/TP2\leq10$;

where IN12 is a distance on the optical axis between the first lens and the second lens; TP1 is a thickness of the first lens on the optical axis; TP2 is a thickness of the second lens on the optical axis.

18. The optical image capturing system of claim 9, wherein at least one lens among the first lens to the seventh lens is a light filter, which is capable of filtering out light of wavelengths shorter than 500 nm.

19. An optical image capturing system, in order along an optical axis from an object side to an image side, comprising:
a first lens having negative refractive power;
a second lens having refractive power;
a third lens having refractive power;
a fourth lens having refractive power;
a fifth lens having refractive power;
a sixth lens having refractive power;
a seventh lens having refractive power; and
an image plane;
wherein the optical image capturing system consists of the seven lenses having refractive power; each lens among the first lens to the seventh lens has an object-side surface, which faces the object side, and an image-side surface, which faces the image side; at least one surface of at least one lens among the first lens to the seventh lens has at least an inflection point thereon;
wherein the optical image capturing system satisfies:

$1.0\leq f/HEP\leq10.0$;

$0\ deg<HAF\leq150\ deg$; and $0.9\leq2(ARE/HEP)\leq2.0$;

where f1, f2, 0, f4, f5, f6, and f7 are focal lengths of the first lens to the seventh lens, respectively; f is a focal length of the optical image capturing system; HEP is an entrance pupil diameter of the optical image capturing system; HOS is a distance in parallel with the optical axis between an object-side surface, which face the object side, of the first lens and the image plane; InTL is a distance from the object-side surface of the first lens to the image-side surface of the seventh lens on the optical axis; for any surface of any lens; HAF is a half of a maximum field angle of the optical image capturing system; HOI is a maximum height for image formation perpendicular to the optical axis on the image plane; ARE is a profile curve length measured from a start point where the optical axis passes therethrough, along a surface profile thereof, and finally to a coordinate point of a perpendicular distance where is a half of the entrance pupil diameter away from the optical axis.

20. The optical image capturing system of claim 19, wherein the optical image capturing system further satisfies:

$0.9\leq ARS/EHD\leq2.0$;

where, for any surface of any lens, EHD is a maximum effective half diameter thereof, ARS is a profile curve length measured from a start point where the optical axis passes therethrough, along a surface profile thereof, and finally to an end point of the maximum effective half diameter thereof.

21. The optical image capturing system of claim 19, wherein the optical image capturing system further satisfies:

$0\ mm<HOS\leq50\ mm$.

22. The optical image capturing system of claim 19, wherein the optical image capturing system further satisfies:

$0.05\leq ARE71/TP7\leq25$; and $0.05\leq ARE72/TP7\leq25$;

where ARE71 is a profile curve length measured from a start point where the optical axis passes the object-side surface of the seventh lens, along a surface profile of the object-side surface of the seventh lens, and finally to a coordinate point of a perpendicular distance where is a half of the entrance pupil diameter away from the optical axis; ARE72 is a profile curve length measured from a start point where the optical axis passes the image-side surface of the seventh lens, along a surface profile of the image-side surface of the seventh lens, and finally to a coordinate point of a perpendicular distance where is a half of the entrance pupil diameter away from the optical axis; TP7 is a thickness of the seventh lens on the optical axis.

23. The optical image capturing system of claim 19, wherein the optical image capturing system further satisfies:

$0.05\leq ARE61/TP6\leq25$; and $0.05\leq ARE62/TP6\leq25$;

where ARE61 is a profile curve length measured from a start point where the optical axis passes the object-side surface of the sixth lens, along a surface profile of the object-side surface of the sixth lens, and finally to a coordinate point of a perpendicular distance where is a half of the entrance pupil diameter away from the optical axis; ARE62 is a profile curve length measured from a start point where the optical axis passes the image-side surface of the sixth lens, along a surface profile of the image-side surface of the sixth lens, and finally to a coordinate point of a perpendicular distance where is a half of the entrance pupil diameter away from the optical axis; TP6 is a thickness of the sixth lens on the optical axis.

24. The optical image capturing system of claim 19, further comprising an aperture an image sensor, and a driving module, wherein the image sensor is disposed on the image plane; the driving module is coupled with the lenses to move the lenses; the optical image capturing system further satisfies:

$0.2 \leq InS/HOS \leq 1.1$;

where InS is a distance between the aperture and the image plane on the optical axis.

* * * * *